United States Patent [19]
Fukatsu et al.

[11] Patent Number: 5,625,350
[45] Date of Patent: Apr. 29, 1997

[54] AUDIO/VIDEO COMMUNICATION SYSTEM AND METHOD

[75] Inventors: Hitoshi Fukatsu; Takashi Miyake; Tadashi Tanihira; Kouichi Sato; Tadashi Sano, all of Iwaki, Japan

[73] Assignee: Alpine Electronics, Inc., Tokyo, Japan

[21] Appl. No.: 364,861

[22] Filed: Dec. 27, 1994

[30] Foreign Application Priority Data

Dec. 27, 1993 [JP] Japan .................................. 5-330317
Dec. 27, 1993 [JP] Japan .................................. 5-330322

[51] Int. Cl.⁶ .................................................. H04Q 9/00
[52] U.S. Cl. .............................. 340/825.25; 340/825.24; 340/825.06; 340/825.08
[58] Field of Search .................... 340/825.25, 825.24, 340/825.06, 825.5, 825.07, 825.08, 825.54; 370/85.8, 85.6

[56] References Cited

U.S. PATENT DOCUMENTS

| | | |
|---|---|---|
| 4,715,031 | 12/1987 | Crawford et al. . |
| 4,808,992 | 2/1989 | Beyers, Jr. et al. . |
| 4,972,184 | 11/1990 | Go et al. .......................... 340/825.25 |
| 5,054,022 | 10/1991 | van Steenbrugge ................. 340/825.5 |
| 5,223,825 | 6/1993 | Ikezaki .......................... 340/825.25 X |
| 5,280,281 | 1/1994 | Shimotsuma et al. ............. 340/825.24 |
| 5,305,355 | 4/1994 | Go et al. ........................ 340/825.24 X |
| 5,351,041 | 9/1994 | Ikata et al. ..................... 340/825.24 |
| 5,402,115 | 3/1995 | Tanaka ........................... 340/825.06 |

*Primary Examiner*—Edwin C. Holloway, III
*Attorney, Agent, or Firm*—Guy W. Shoup; Patrick T. Bever

[57] ABSTRACT

A communication system for e.g. an automobile including a system control unit for activating a selected audio/video device (such as an AM/FM tuner or a navigation system) in response to a request signal transmitted on a bus from a command input terminal. The system control unit generates command signals necessary to activate the selected audio/video device in response to the request signal, including command signals to de-activate any currently-operating devices. Conversely, adjustment commands (such as volume change or channel change commands) are transmitted directly (that is, unchanged by the system control unit) from the command input terminal to the selected audio/video device on the first bus line. In addition, the audio/video devices transmit reset signals whenever power is shut-off and then restored. Each reset signal includes a transmission source address corresponding to the audio/video device which transmitted the signal. The system control unit compares these transmission source addresses with a stored address corresponding to the selected audio/video device, and transmits a command signal to restart the selected audio/video device. Further, when the system control unit is turned off and then restored, the system control unit transmits a reset command to all of the audio/video devices connected to the bus.

6 Claims, 19 Drawing Sheets

| DA | SA | DATA | CHECK CODE |
|----|----|----|----|

DA : DIRECTED ADDRESS
SA : TRANSMISSION SOURCE ADDRESS
DATA : TRANSMISSION DATA
CHECK CODE : ERROR DETECTION CODE

AUDIO/VIDEO COMMUNICATION SYSTEM AND METHOD

BACKGROUND OF THE INVENTION

1. Field of the Invention

The present invention relates to a communication system, and more specifically, to a communication system including a plurality of audio/video devices, a central control unit and a common input terminal interconnected through communication lines.

2. Description of the Related Art

Prior art audio/video communication systems interconnect a plurality of audio/video devices (units) including one or more audio signal source (such as AM/FM tuners, cassette players and compact disk (CD) players) and/or one or more video signal source (such as television receivers and navigation systems), an input terminal (operation unit) provided as a user interface, and a central control unit, all of which being interconnected through communication (bus) lines. In such systems, switching from an active (playing) audio/video device to an inactive (selected) audio/video device, turning on/off of power to the respective devices and transmitting operation changes (such as volume control and channel seek), which are sent to the respective sources from the operation unit, are transmitted entirely through the central control unit.

FIG. 20 conceptually shows a prior art system, wherein numeral 1a denotes an operation unit, numeral 2 denotes a central control unit, and numerals 3a, 3b and 3c denote a plurality of audio/video devices (audio signal sources or video signal sources). In the prior art system, when a user wishes to activate an AM/FM tuner (which may be the source 3a), an AM/FM tuner key is depressed on the operation unit 1a. In accordance with the key operation, the operation unit 1a transmits a request signal the central control unit to activate the AM/FM tuner 3a. If other audio units are in operation when this request signal is received, the central control unit 2 transmits a first command signal to turn off the operating audio units and then transmits a second command signal to activate the AM/FM tuner 3a. Further, when, for example, a band switch key, a preset channel tuning key or a seek key are depressed at the operation unit 1a while the AM/FM tuner 3a is in operation, respective control request signals are sent to the central control unit 2. The central control unit 2 then transmits command signals to control the AM/FM tuner 3a based on these control request signals to switch a band, tune a preset channel and effect seeking operation. Such control signals are used to control all of the audio sources (such as a tape player or a CD player) and all of the video sources.

The above-mentioned control method, however, has a deficiency in that it cannot support additional new sources and new operation units. For example, in order to connect a navigation system, a CD changer and their corresponding operation units to the above-mentioned system, the central control unit 2 must be provided with circuitry which can support the operation signals required for executing the special operations associated with the navigation system and the CD changer. However, it is difficult to foresee the operation requirements of new types of audio/video devices such that the central control unit can communicate with the new devices. Eventually, as new devices are connected, the prior art system becomes unable to support the addition of new devices and their corresponding operation units.

Further, a system installed, for example, on an automotive vehicle includes multiple operation units which are located in both the front and rear seat areas of the vehicle, or can be operated through a remote control unit. This arrangement is indicated by a plurality of operation units 1a, 1b and 1c which are indicated as connected to the central control unit 2 by dotted lines in FIG. 20. In this case, since various request signals are issued to the central control unit 2 from the respective control units, the burden on the central control unit is increased. Thus, there arises a problem that processing cannot take place at high speed, and a long time is necessary to switch signal sources and to execute command operations, and sometimes operation request signals are ignored.

Further, when power supplied to the respective audio/video devices or the control unit is momentarily interrupted for any reason and then restored in the system described above, the following problems arise:

A first problem arises when the power supplied to a selected device being played is momentarily interrupted and then restored while the power supplied to the central control unit is uninterrupted. The selected device stops because the internal state thereof is initialized (reset) when the power supply is restored. Although it is the control unit that controls the selected device, the control unit's memory contains information that the selected device is being played (not stopped by the interruption of the power supply). In other words, since the control unit recognizes that the device is being played, the control unit does not transmit a "play" control signal to the selected device. Therefore, the device is unable to output sound when the power supply to the device is restored. In some systems, even if a "play" key on an associated control unit is operated to select the device, since the control unit recognizes that the device is being played, it does not transmit the control signal to the device to enter the play state. In this case, it is necessary to briefly select another device, and then select the original device by which operability is deteriorated.

A second problem arises in a case that the power supply to a control unit is momentarily interrupted and then restored while power supplied to a selected (playing) device is uninterrupted. Since the control unit initializes (resets) its internal state when the power supply is restored, the memory of the control unit does contain information regarding which device is being played. Thus, there is a problem that the control unit cannot stop the play state of the source, and the source continues to freely play.

Incidentally, the control unit is typically arranged such that when the selection of a new source is commanded by a control unit or the like, the control unit at first transmits a command signal causing the selected device being played to stop, and then the control unit transmits a command signal causing the selected device to play. Since the control unit cannot recognize which device is being played when the power supply is restored, there is a problem that the selected device cannot be caused to play or, if the control unit subsequently commands a different device to play, two sources are caused to play at the same time.

In view of the above-mentioned problems, in accordance with the present invention, a communication unit is capable of reducing the burden on a central control unit and further supporting the addition of new sources and new operation units.

Also in accordance with the present invention, a communication system is capable of automatically controlling a source to enter a play state when the power supply to the source being played is momentarily interrupted and then restored, and a communication unit is capable of automatically stopping a source being played and further causing the memory content of the control unit to coincide with the operating condition of the system when the power supply to the control unit is momentarily interrupted and then restored.

SUMMARY OF THE INVENTION

An internal communication system for, e.g., audio/video devices installed in a vehicle includes a system control unit for activating a selected audio/video device (such as an AM/FM tuner or a navigation system) in response to a request signal transmitted on a first bus line from a command input terminal. The selected audio/video device transmits signals to an output device (such as a speaker or a video monitor) on a second bus line. The system control unit generates command signals necessary to activate the selected audio/video device in response to the request signal, including command signals to deactivate any currently-operating devices.

In accordance with a first aspect of the present invention, the communication system allows adjustment commands (such as volume change or channel change commands) to be transmitted directly (that is, unchanged by the system control unit) from a command input terminal to the selected audio/video device on the first bus line. This permits the communication system to integrate additional audio/video devices without changing the system control unit and without overwhelming the system control unit with request signals.

In accordance with a second aspect of the present invention, the audio/video devices are programmed to transmit reset signals on the bus whenever they are connected to a power source. Each reset signal includes a transmission source address corresponding to the audio/video device which transmitted the signal. The system control unit receives the transmitted reset signals and compares the transmission source addresses with a stored address corresponding to the selected audio/video device (if one exists). If one of the transmission source address of one of the reset signals corresponds with the stored address, the system control unit then transmits a command signal to restart the selected audio/video device. Because the audio/video devices transmit reset signals to the system control unit, the system controller is able to restart the selected audio/video device whenever power to the selected audio/video device is turned off and then restored.

In accordance with a third aspect of the present invention, whenever power to the system control unit is turned off and then restored, the system control unit transmits a reset command to all of the audio/video devices connected to the bus. The reset commands shut off the selected audio/video device (if one exists). Subsequent request signals entered by a user then determine the selected audio/video device. This prevents the problem of two or more devices operating simultaneously.

BRIEF DESCRIPTION OF THE DRAWINGS

FIG. 16 is a diagram showing a processing sequence when an ACC power supply is turned on;

DETAILED DESCRIPTION OF THE PREFERRED EMBODIMENTS

Figure 1A:
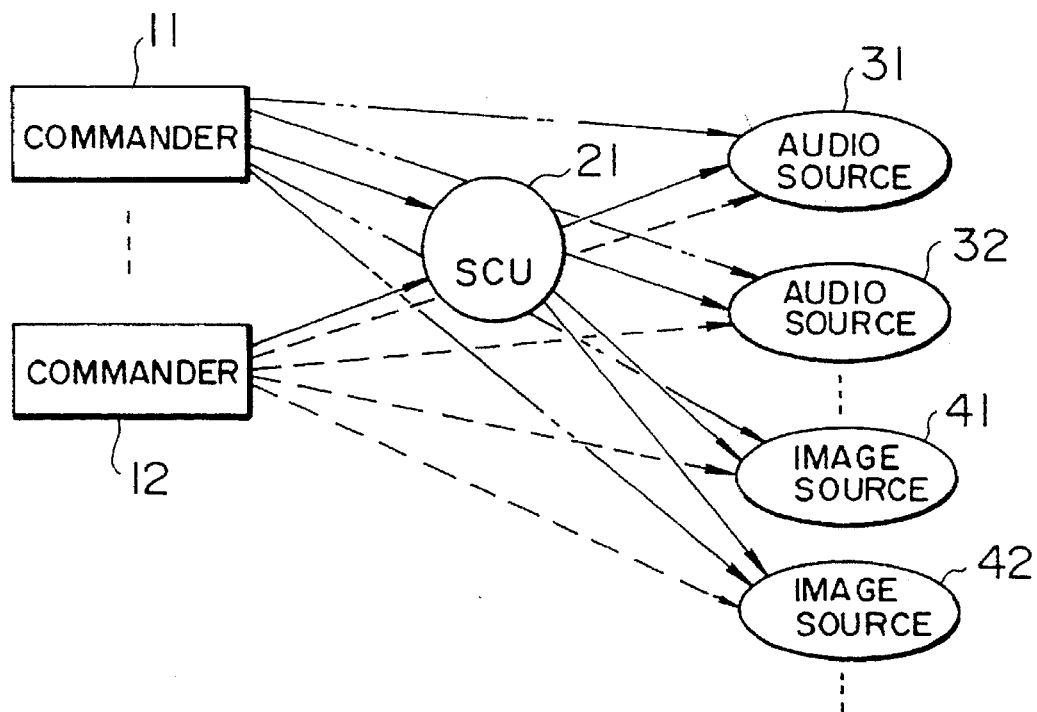
FIGS. 1A and 1B are diagrams showing operation of the present system.
Figure 1B:
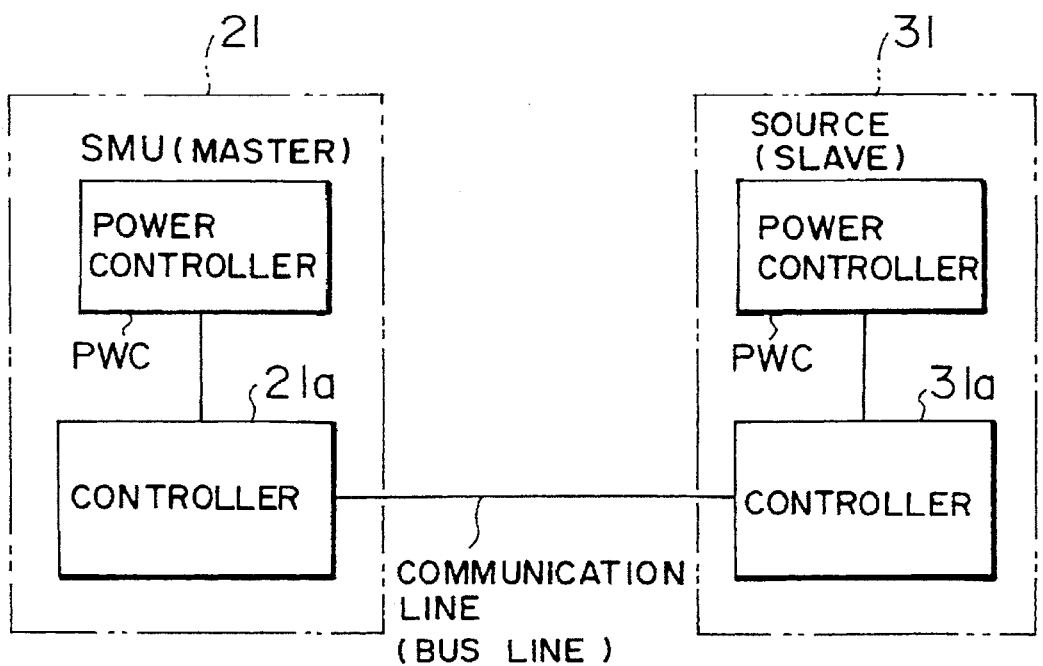

FIGS. 1A and 1B are diagrams showing operation of a system in accordance with the present invention.

In FIG. 1A, numerals 11 and 12 denote of command input terminals (commanders) which serve as user interfaces, numeral 21 denotes a system control unit configured in accordance with the present invention, numerals 31 and 32 denote audio signal sources (such as AM/FM tuners, cassette players and compact disk (CD) players), and numerals 41 and 42 denote video signal sources (such as television receivers and navigation systems). Further, in FIG. 1B, numerals 21a and 31a denote controllers and PWC denotes a power controller.

The audio signal sources 31 and 32, the video sources 41 and 42, the system control unit 21, the commanders 11 and 12 are interconnected through a communication (bus) line. The commanders 11 and 12 or the respective devices transmit request signals on the communication line to the system control unit 21 to switch (change) the currently-playing device to a selected device. The system control unit 21 transmits control signals to activate the selected device and deactivate (stop) the currently-playing device through the communication line based on the switch request. Conversely, when control signals are transmitted from the commanders 11 and 12 to, for example, change a playing volume or to change channels (frequencies), these signals are transmitted directly to the respective audio signal source 31 and 32 or video signal source 41 and 42.

Since (1) the system control unit 21 controls operations such as switching of the signal sources and turning on and off of the power to the entire system, which must be centrally controlled by one unit and (2) the functions which are characteristic to the respective signal sources are controlled by issuing commands directly to the signal sources from the commanders, the burden on the system control unit 21 is reduced. In addition, since the system control unit 21 only needs to support switching of the signal sources regardless of the specific control commands associated with the signal sources, entirely new audio sources and video sources can be easily added to the system.

The above-mentioned first aspect and additional aspects in accordance with the present invention will now be described in further detail.

(a) Overall Arrangement of Audio/Video System

Figure 2:
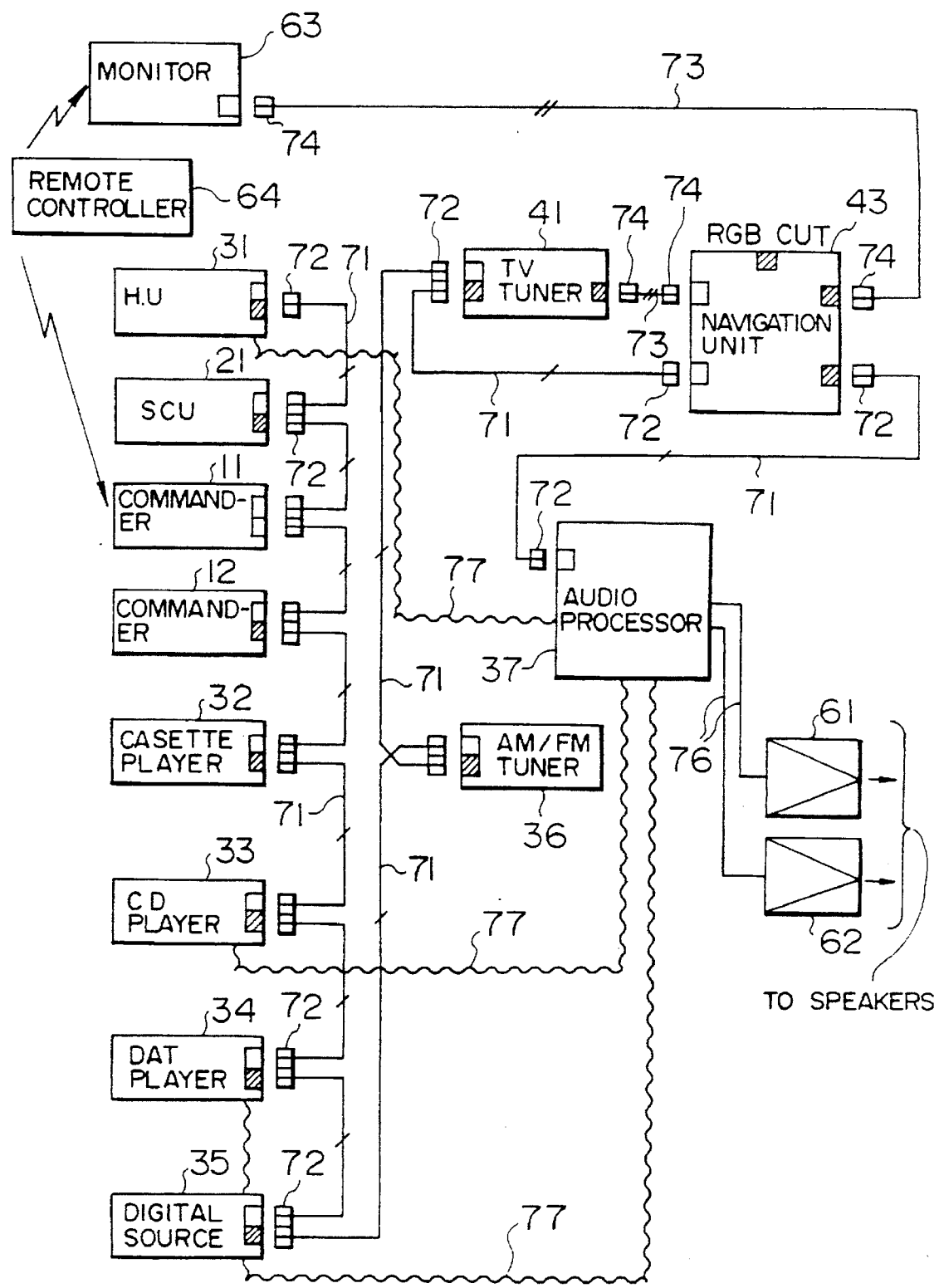
FIG. 2 is a block diagram showing the overall arrangement of the present audio/video system.

FIG. 2 is a block diagram showing the overall arrangement of an audio/video system according to the present invention which includes a system control unit (SCU) 21 as an independent unit. Note, as described below, the system control unit 21 may be included in a head unit or a commander.

Numerals 11 and 12 denote command input terminals (commanders) which are user interfaces, numeral 21 denotes a system control unit (SCU) and numeral 31 denotes a head unit (HU) which includes, for example, an AM/FM tuner, a cassette tape player and a CD player as audio sources. Numeral 32 denotes the cassette tape player, numeral 33 denotes the CD player, numeral 34 denotes a DAT player, numeral 35 denotes digital audio sources such as a minidisc player, or a digital compact cassette (DCC) player, numeral 36 denotes the AM/FM tuner, and numeral 37 denotes an audio processor. The latter-mentioned digital audio signal sources overlap in type the formerly-mentioned audio signal sources of the head unit 31 because there is sometimes a requirement to assemble an additional system having, for example, superior sound quality, as compared to the audio signal sources included in the head unit 31. Further, the audio/video system may employ any arbitrary arrangement, and, for example, only the audio sources of the head unit may be used or the head unit may be omitted depending upon the system.

Numeral 41 denotes a TV tuner and numeral 43 denotes a navigation system. Video signal sources may be arbitrarily arranged in the same way as the audio signal sources. For example, the system may include no video sources, the system may include only a TV tuner, or the system may include multiple video sources.

Numerals 61, 62 denote amplifiers for amplifying audio signals and numeral 63 denotes a video monitor such as, for example, a liquid crystal display, and numeral 64 denotes a remote controller. The amplifiers, video monitor and speakers are generally referred to herein as output devices.

Numeral 71 denotes a bus (each bus being conventionally denoted by an inclined line at the center thereof) having lines such as communication lines and analog audio signal lines (L, R), and each of the cables has connectors 72 connected to the both ends thereof. Numeral 73 denotes cables (each denoted by two inclined lines at the center thereof) for connecting the video composite display signals of the video devices. The cables include lines such as a video composite signal line and a remote control signal line, and each of the cables is provided with connectors 74 connected to the both ends thereof. Numeral 76 denotes audio cables for transmitting analog audio signals. Numeral 77 denotes optical fibers for transferring digital data, each of the optical fibers 77 having optical connectors at the both ends thereof. An optical transmitter (electro-optical (E/O) converter) is connected to the optical connector on a transmission side and an optical receiver (opto-electronic (O/E) converter) is connected to the optical connector on a receiving side.

Figure 3A:
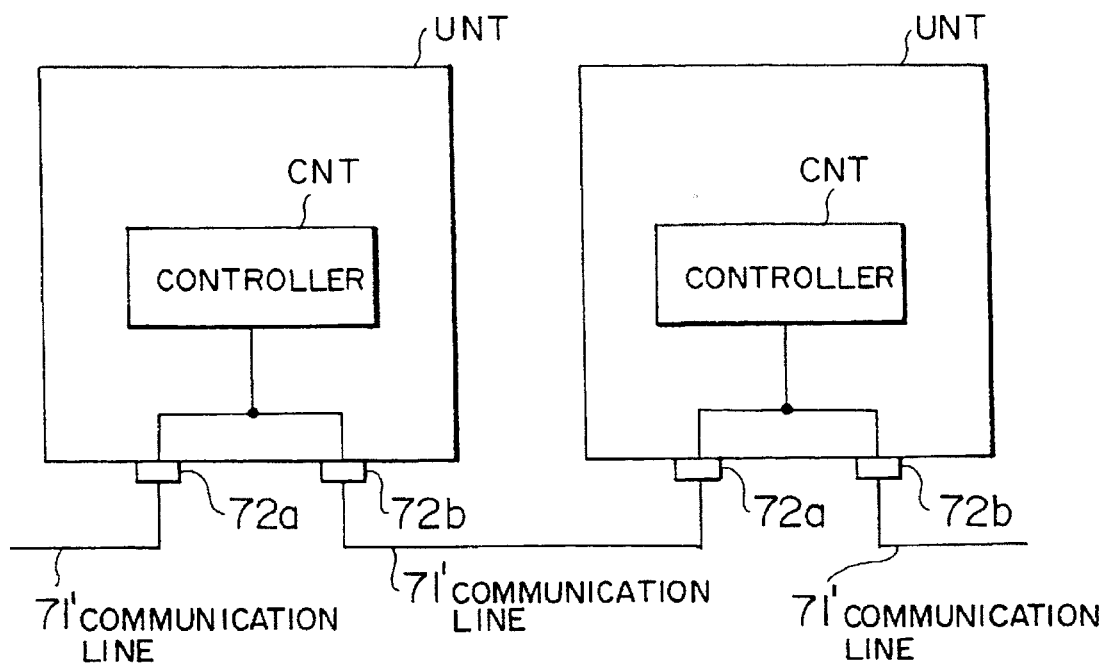
FIGS. 3A and 3B are block diagrams showing the connection between respective units.

As shown in FIG. 3A, the communication lines 71' included in the cable 71 are connected in each unit UNT in a continuous fashion as well as being connected to the controller CNT of each unit. The controller CNT receives data transmitted from other units on the communication line and executes a predetermined control in response to the received data. In addition, the controller CNT transmits data to other units on the communication line. With this arrangement, all the units interconnected through the communication lines 71' can communicate with each other. Note, data is bidirectionally transmitted on the communication lines.

Figure 3B:
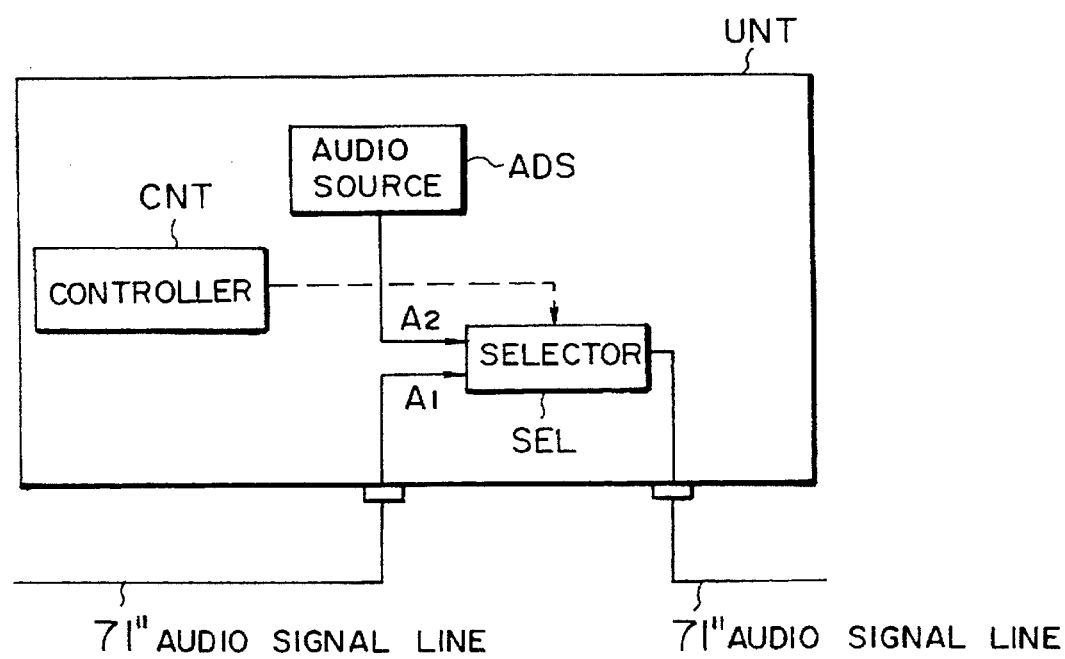

As shown in FIG. 3B, analog audio signal lines 71" are connected in a unit UNT, which contains an audio source ADS, such that a selector SEL selects either analog audio signals A1 transmitted on the audio signal line 71" from a previous unit, or audio signals A2 output from the audio source ADS according to a command from the controller CNT, and transfers the selected signals to a subsequent unit. Note, the analog audio signal lines 71" are connected to pass, unimpeded, through units without an audio source. Therefore, analog audio signals output from a predetermined one of the audio sources ADS reach the audio processor (AP) 37 through the analog signal lines 71". At the audio processor 37, the selected audio signals are subjected to an audio signal processing operation, and then output to the amplifiers 61, 62.

The video signal lines 73 are arranged in the same manner as the analog audio signal lines. That is, predetermined video signals are selected at each unit, and the selected video signals reach the video monitor 63 through each video device and are displayed on a display screen.

The optical fibers 77 are connected to the audio processor either through other digital audio sources or are directly connected thereto. The audio processor 37 selects predetermined digital audio data, subjects the data to D/A conversion and outputs the converted data to the amplifiers 61, 62.

A remote control signal output from the remote controller 64 is received by the remote control light receiving units disposed in the commander 11 and the video monitor 63. On receiving the remote control signal, the commander 11 outputs a predetermined command to the communication line 71 based on a command from the remote controller 64 in the same way as the case where a command is issued through key operation. On receiving the remote control signal, the video monitor 63 transmits the remote control signal to each video device through the cables 73. Since the remote controller 64 can command operation to each of the video devices, each video device receives the remote control signal and executes the commanded operation.

(b) Frame Format

Figures 4, 5:
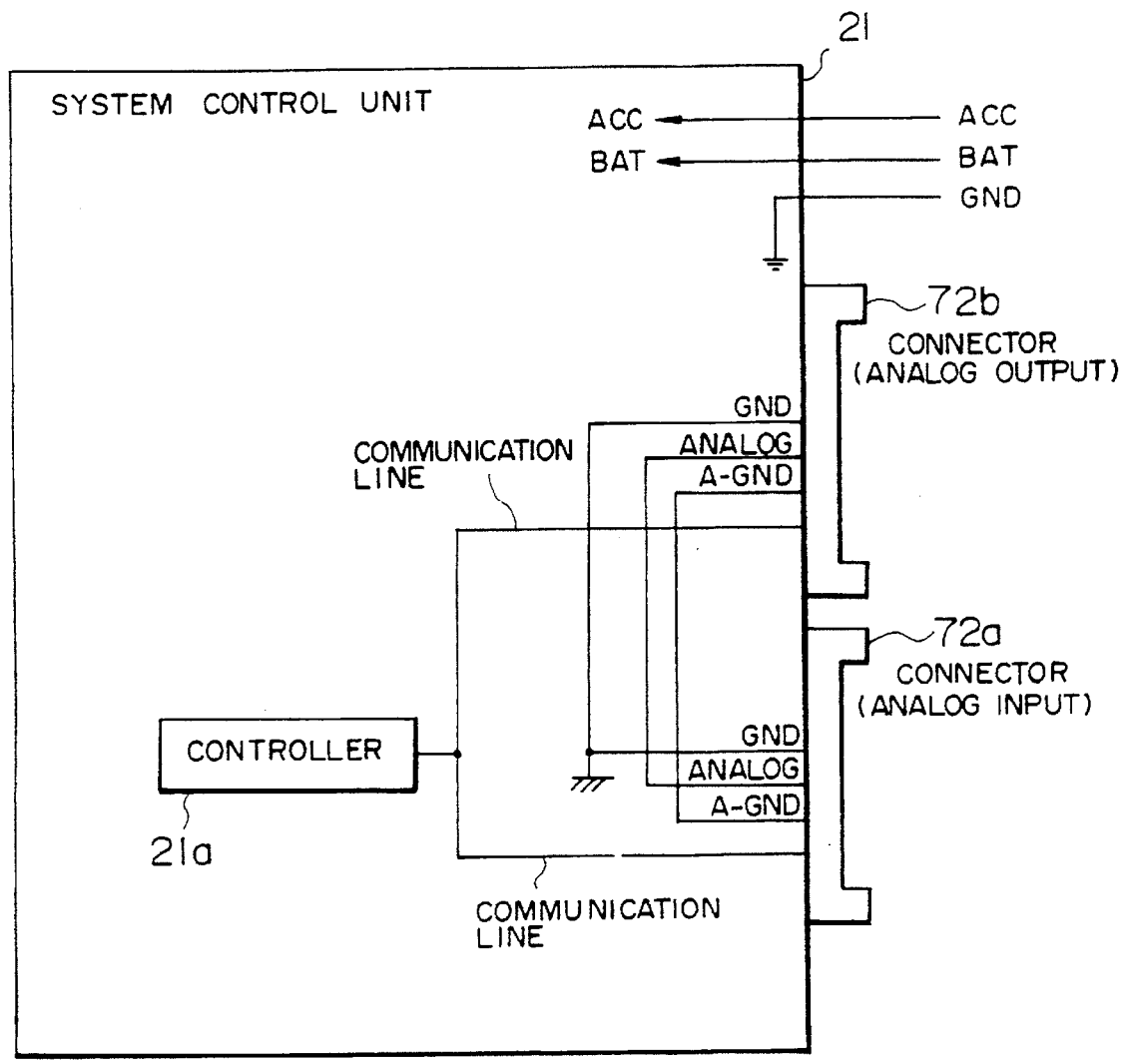
FIG. 4 is a diagram showing a frame format.
FIG. 5 is a simplified schematic showing the arrangement of a system control unit.

Data is transferred on the communication lines (buses) of the cables 71 in a signal frame format. That is, a transmission source unit creates a signal frame which includes a destination address, a transmission source address, transmission data (request or command information) and an error detection code, and transmits the frame to the bus. The frame is transferred on the communication lines 71 and received by the unit having the same address as the destination address contained in the frame such that the receiving unit executes predetermined operation. FIG. 4 shows a frame format wherein DA denotes the destination address, SA denotes the transmission source address, DATA denotes the transmission data and CHECK CODE denotes the error detection code.

(c) Arrangement of each Unit

System Control Unit (SCU)

FIG. 5 is a simplified schematic showing the system control unit 21 wherein numeral 72a denotes an analog input side connector and numeral 72b denotes an analog output side connector. Numeral 21a denotes a controller including a microprocessor for e.g. centrally controlling the switching of signal sources, and turning power on and off. All the signals from the previous stage input through the connector 72a are output to the unit of the next stage through the output side connector 72b. Further, data flows bidirectionally on the communication lines, and the controller 21a receives data addressed to it and sends data according to the format shown in FIG. 4 to the bus.

The controller 21a switches the audio sources and video sources through the bus (communication lines) 71 in accordance with a source switch request received from the commanders 11, 12 (FIG. 2) and each source, as well as turns on and off the power supplied to the system as a whole.

Commander

Figure 6:
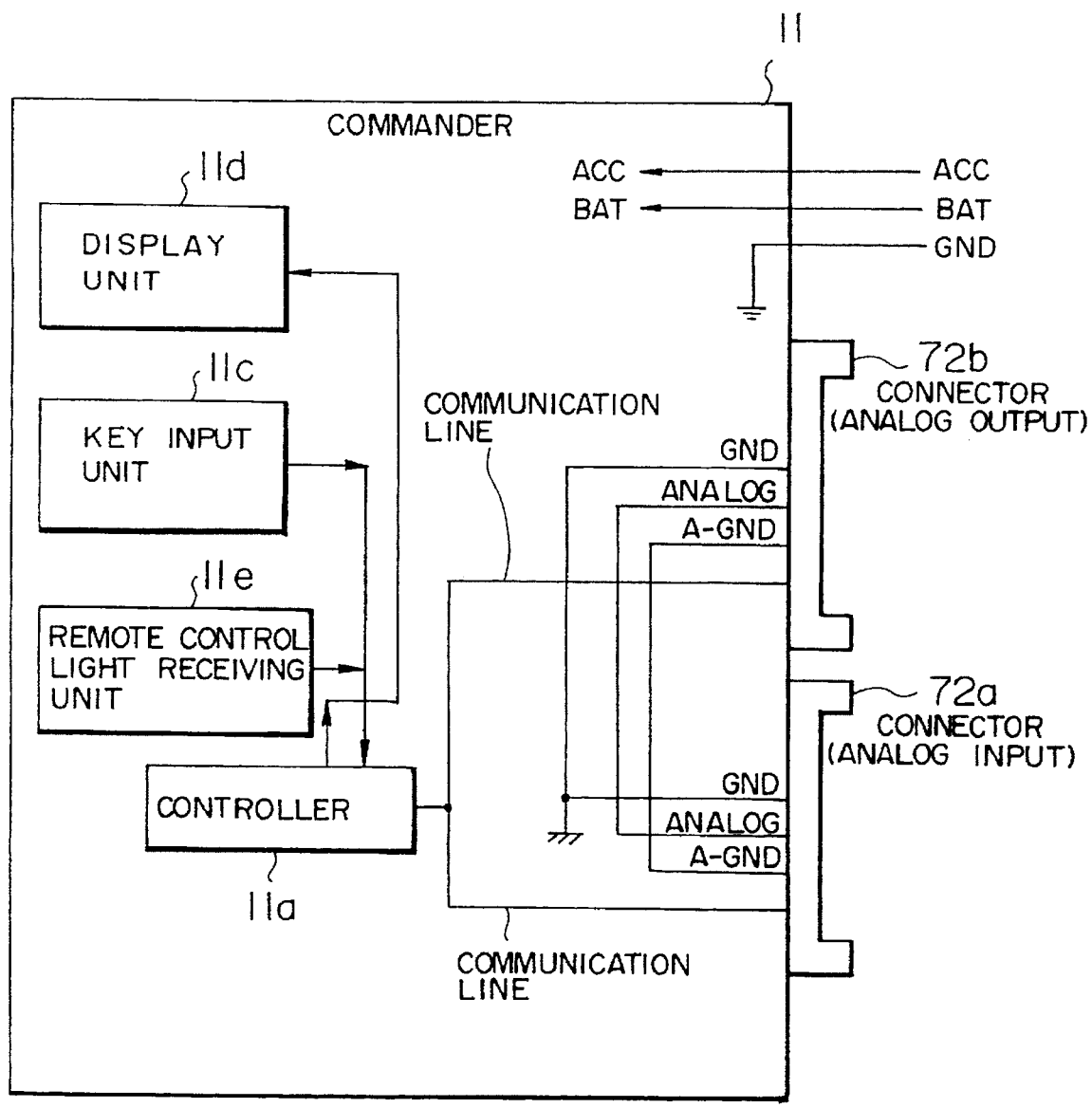
FIG. 6 is a simplified schematic showing the arrangement of a commander.

FIG. 6 is a simplified schematic showing the arrangement of the commander 11, wherein numeral 72a denotes an analog input side connector and numeral 72b denotes an analog output side connector. Numeral 11a denotes a controller including a microprocessor, numeral 11c denotes a key input unit for entering request and command signal frames corresponding to the activation of a selected audio/video device (switching of signal source) and controlling the function characteristic (volume, channel change) associated with each device, numeral 11d denotes a display unit and numeral 11e denotes a remote control light receiving unit.

All the signals input by the connector 72a from the previous stage are output to the unit of the next stage through the output side connector 72b. The controller 11a receives data addressed to it from the bus as well as creates data (data for commanding a source activation request and the execution/stop of the function characteristic to each source) corresponding to key operation and remote control operation in accordance with the format shown in FIG. 4 and sends the data to the bus (communication lines 71).

The commander 11 represents any of an audio unit commander, a video device commander, a navigation commander or a commander combining these commanders. Each commander is provided with a source switching key and keys for commanding the respective operations of each unit. For example, the audio unit commander is provided with (1) an AM/FM key, a tape key, and a CD key as the source selection keys, (2) a band switch key, a preset key, and a seek key as AM/FM keys, (3) a play key, a quick feed/rewind key, a Dolby on/off key as tape player keys, (4) a play key, and a music selection up/down key, as CD player keys, and (5) additional keys including a ten digit key pad, a volume up/down key and a bass/treble key.

• Arrangement View of Head Unit

Figure 7:
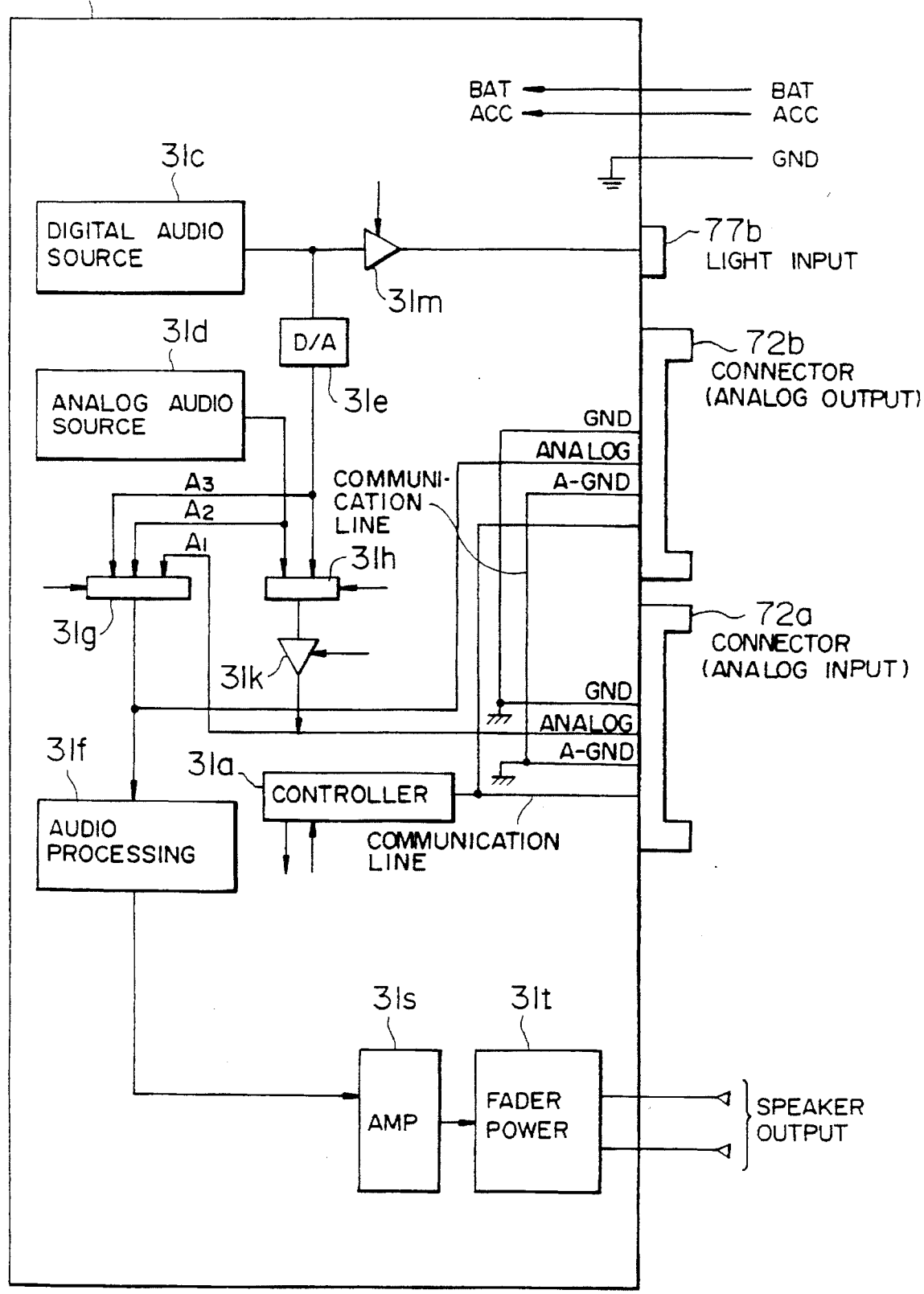
FIG. 7 is a simplified schematic showing the arrangement of a head unit.

FIG. 7 is a simplified schematic showing the arrangement of the head unit (HU) 31 wherein numeral 72a denotes an analog input side connector and numeral 72b denotes an analog output side connector. In the head unit 31, numeral 31a denotes a controller including a microprocessor, numeral 31c denotes a digital audio source (which includes one or more of a CD player, a DAT player, a minidisc player, a DCC player), numeral 31d denotes an analog audio source (which includes one or more of a cassette tape player, an AM/FM tuner), numeral 31e denotes a D/A converter, numeral 31f denotes an audio processing unit, numerals 31g–31h denote selectors, and numerals 31k and 31m denote a mute circuit for removing unnecessary noise and sound resulting from the switching of output. Further, numeral 31s denotes an audio amplifier and numeral 31t denotes a power fader.

When the head unit 31 is used independently, an output from the power fader 31t is input to front and rear speakers mounted on a vehicle. However, when the head unit 31 is assembled to the system shown in FIG. 2, nothing is connected to the output terminal of the power fader 31t.

The selector 31g selects any audio signals of audio signals A1 input from a previous unit through the connector 72a, audio signals A2 output from the analog source 31d and audio signals A3 obtained by subjecting an output from the digital source 31c to D/A conversion under the control of the controller 31a, and sends the selected audio signals to the next unit through connector 72b. For example, when the activation of the analog audio source 31d is commanded through the communication line, the controller 31a selects the audio signals A2 from the analog source 31d and sends them to the next unit. In the same way, when activation of the CD player is commanded, the audio signals A3 output from the D/A converter 31e are selected and sent to the next unit, and when the activation of any audio source is commanded, the audio signals A1 input from the previous unit are selected and sent to the next unit. Further, digital data output from the digital audio source 31c is input to the audio processor 37 through an optical connector 77b.

• Analog Audio Source

Figure 8:
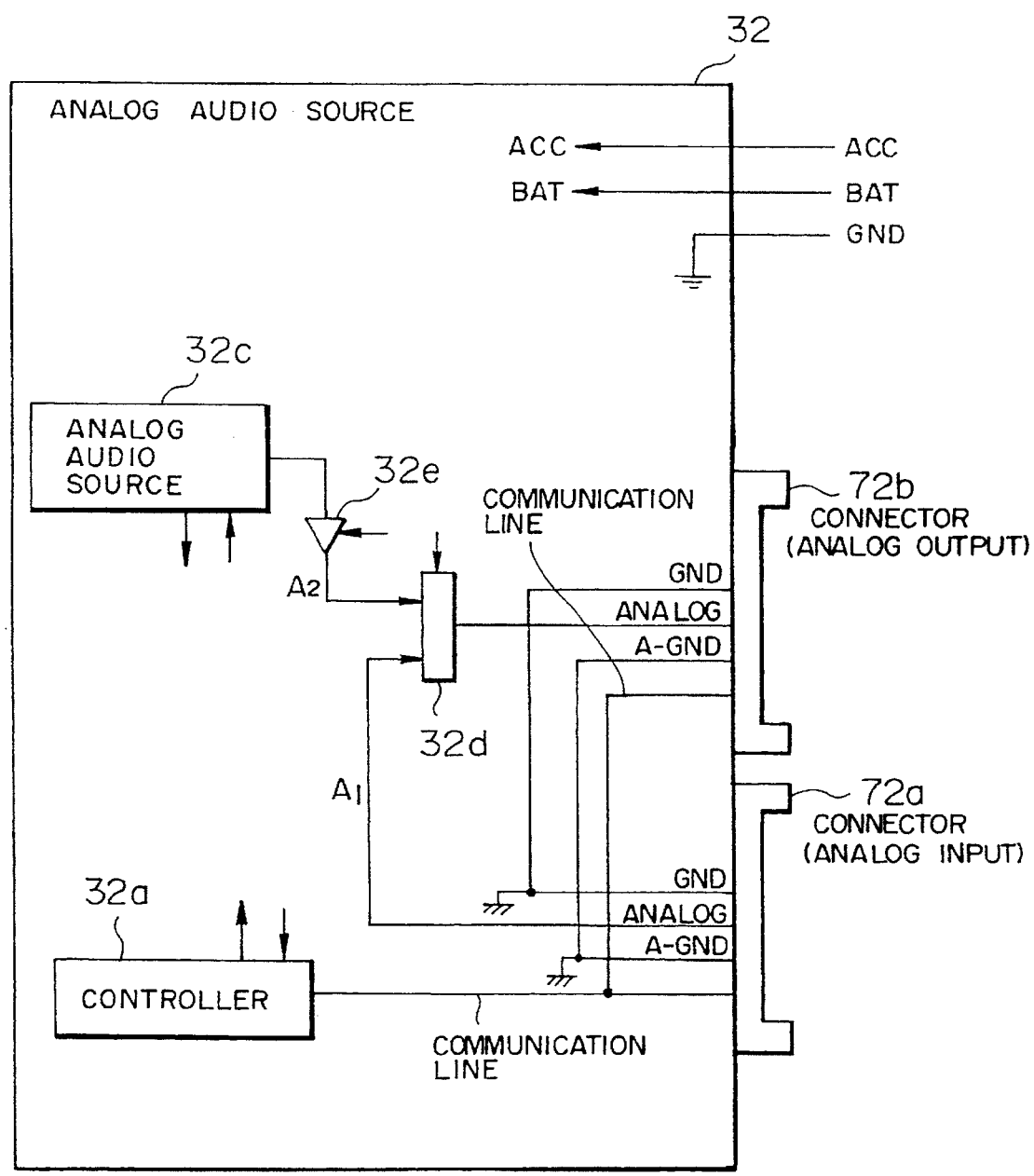
FIG. 8 is a simplified schematic showing the arrangement of an analog/audio source.

FIG. 8 is a simplified schematic showing the arrangement of the analog audio device 32 such as the cassette player, and the AM/FM tuner, wherein numeral 72a denotes an analog input side connector and numeral 72b denotes an analog output side connector. Numeral 32a denotes a controller including a microprocessor, numeral 32c denotes an analog signal generator, numeral 32d denotes a selector, and numeral 32e denotes a circuit for removing unnecessary sound from the source (inter-station noise of the tuner and sound produced when a music is scanned on a tape).

Either analog audio signals A1 received from the previous unit through the connector 72a or audio signals A2 output from the analog signal generator 32c are selected by the selector 32d under the control of the controller 31a and sent to the next unit through connector 72b. For example, when the activation of the analog signal generator 32c is commanded through the communication line, the controller 32a selects the audio signals A2 and sends them to the next unit. On the other hand, when activation of the analog signal generator 32c is not commanded, the audio signals A1 input from the previous unit are selected and sent to the next unit.

• Digital Audio Source

Figure 9:
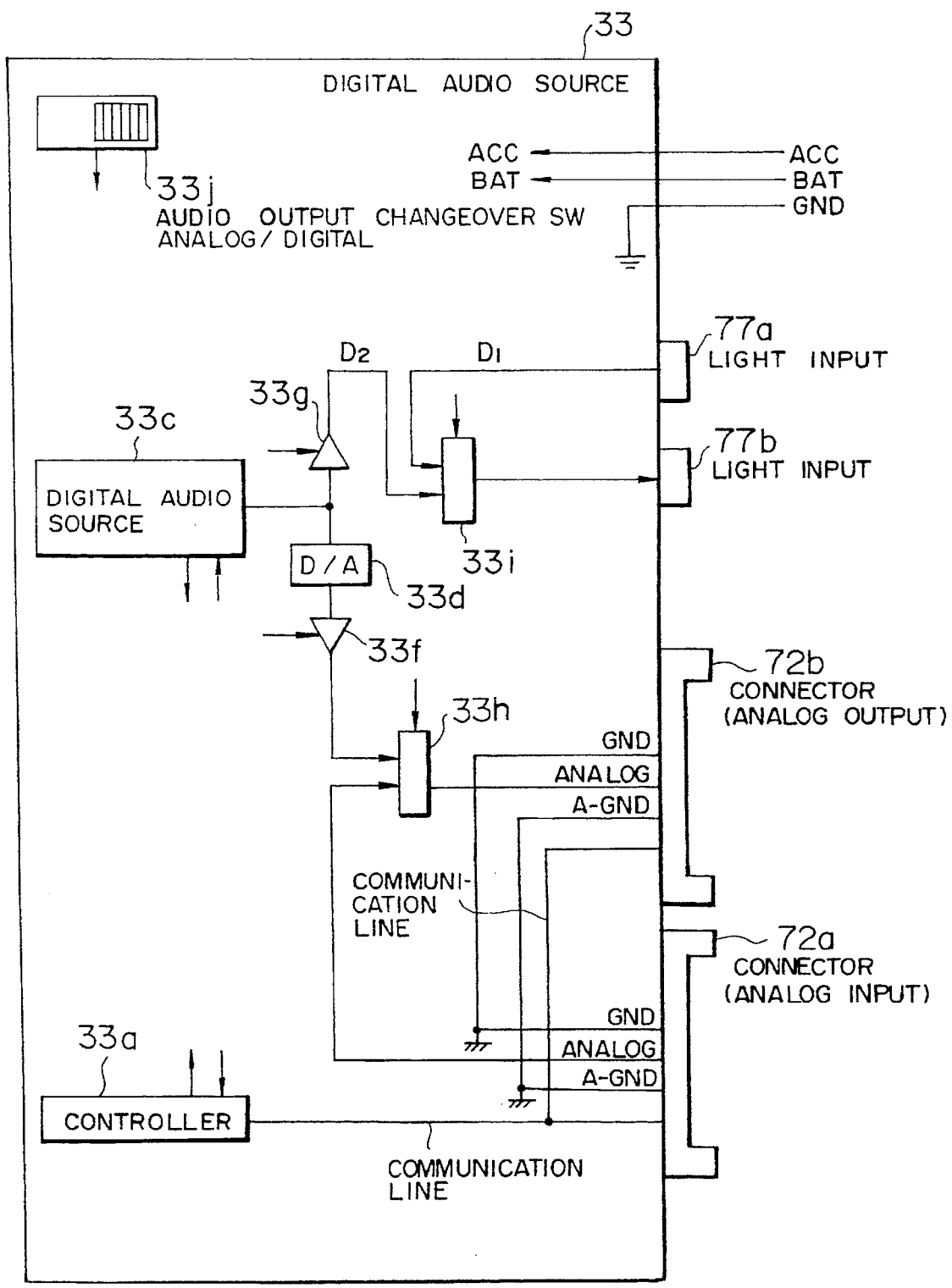
FIG. 9 is a simplified schematic showing the arrangement of a digital audio system.

FIG. 9 is a simplified schematic showing the arrangement of the digital audio device 33 (such as a CD player, a DAT player, a minidisc player, or a DCC player), wherein numeral 72a denotes an analog input side connector, numeral 72b denotes an analog output side connector, numeral 77a denotes an input side optical connector and numeral 77b denotes an output side optical connector.

Numeral 33a denotes a controller including a microprocessor, numeral 33c denotes a digital audio signal generator, numeral 33d denotes a D/A converter, numerals 33f–33g denote circuits for removing unnecessary sound, numerals 33h, 33i denote selectors, and numeral 33j denotes a changeover switch for switching an audio output to digital/analog output.

When the audio output changeover switch 33j selects an analog output, the controller 33a selects either analog audio signals A1 input from a previous audio unit through the connector 72a or analog audio signals A2 output from the D/A converter 33d through the selector 33h. The selected audio signals are then sent to the next unit through connector 72b. On the other hand, when the audio output changeover switch 33j selects a digital output, the controller 33a selects either digital audio signals D1 input from the previous unit through the optical connector 77a or digital audio signals D2 from the digital audio generator 33c through the selector 33i. The selected audio signals are then sent to the digital audio source or the audio processor of the next unit through the optical connector 77b.

• Audio Processor

Figure 10:
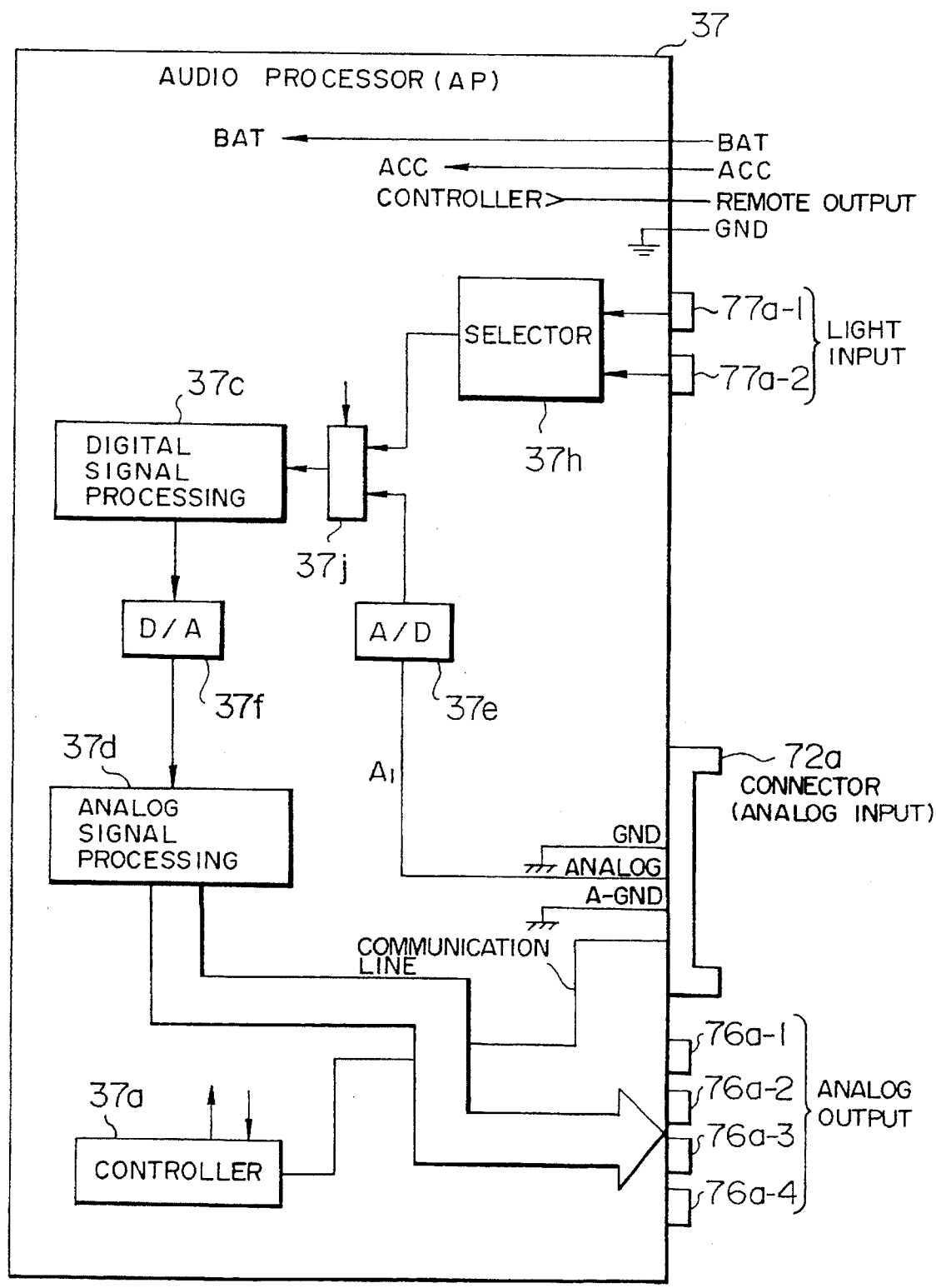
FIG. 10 is a simplified schematic showing the arrangement of an audio processor.

FIG. 10 is a simplified schematic showing the arrangement of the audio processor (AP) 37, wherein numeral 72a denotes an analog side input connector, numerals 76a-1 to 76a-4 denote connectors for inputting audio signals to amplifiers 61, 62 (FIG. 2), and numerals 77a-1 to 77a-2 denote optical connectors for inputting optical signals. Numeral 37a denotes a controller including a microprocessor, numeral 37b denotes a digital signal processing unit, numeral 37d denotes an analog signal processing unit, numeral 37e denotes an A/D converter, numeral 37f denotes a D/A converter, and numerals 37h, 37j denote selectors.

Analog audio signals A1 input from a previous audio unit are input to the A/D converter 37e, converted into a digital signal therein, and then input to the digital signal processing unit 37c through the selector 37j. Further, digital audio signals are input to the digital signal processing unit 37c through the selectors 37h, 37j.

The controller 37a controls each selector, selects audio signals output from the commanded audio source and inputs the selected audio signals to the digital signal processing unit 37c. The digital signal processing unit 37c digitally processes the input audio signals, and the D/A converter 37f converts an output from the digital signal processing unit into analog signals and inputs the signals to the analog audio signal processing unit 37d. The analog signal processing unit 37d subjects the input analog signals to predetermined analog signal processing (such as volume control, front/rear volume ratio control, right/left volume ratio control, and mute control) and inputs the processed signal to the amplifiers 61 and 62.

• TV Tuner

Figure 11:
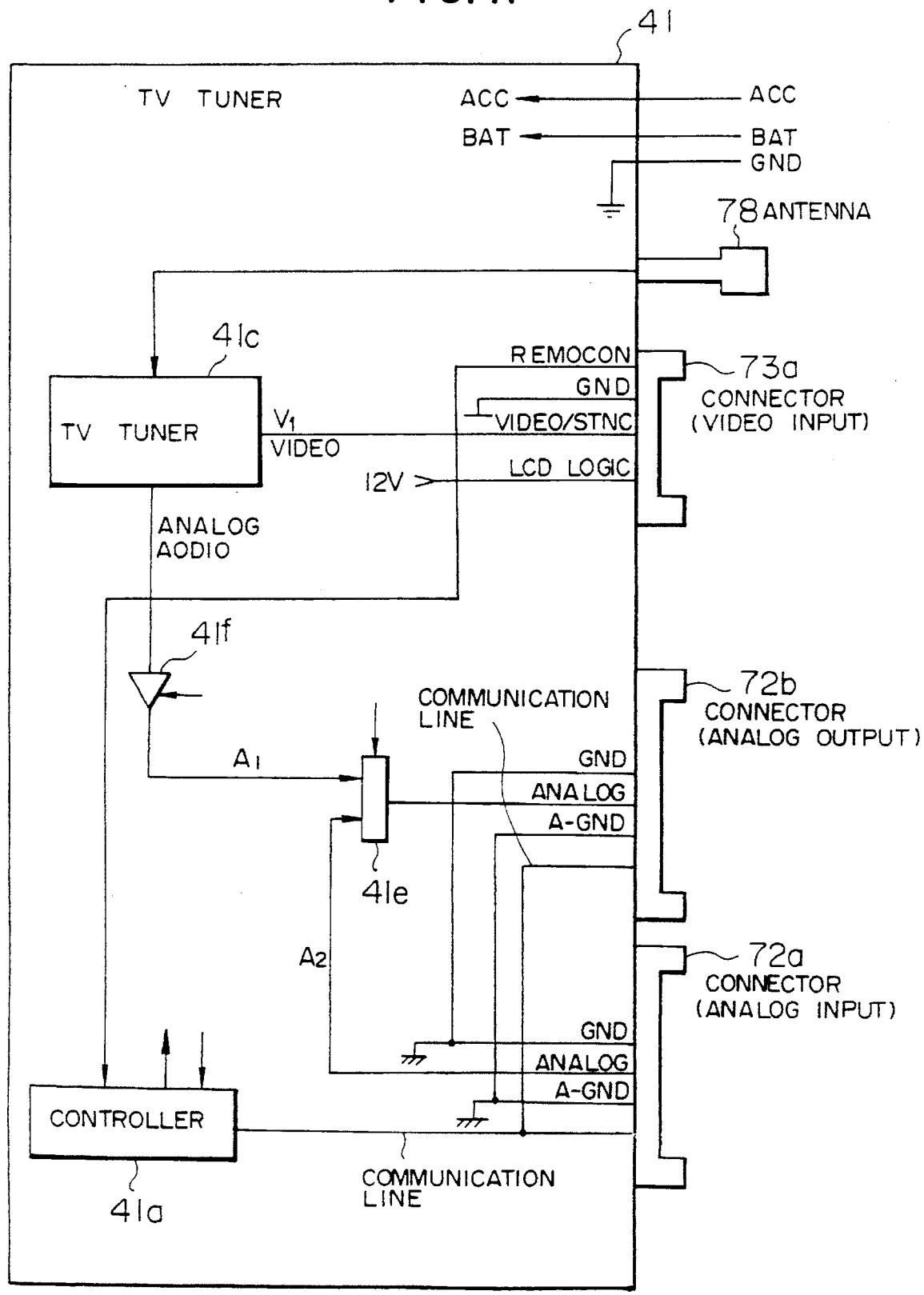
FIG. 11 is a simplified schematic showing the arrangement of a TV tuner.

FIG. 11 is a simplified schematic showing the arrangement of the TV tuner 41, wherein numeral 72a denotes an analog input side connector, numeral 72b denotes an analog output side connector, numeral 73a denotes a connector for outputting video signals as well as receiving a remote control signal, and numeral 78 denotes a TV antenna terminal.

Numeral 41a denotes a controller includes a microprocessor, numeral 41c denotes a TV signal generator, numeral 41e denotes a selector, and numeral 41f denotes a circuit for removing unnecessary sound output from the source. The controller 41a controls the selector 41e, selects any audio signals of audio signals A1–A2 input from the TV tuner and the connector 72a, respectively, and outputs the selected audio signals through the connector 72b. Further, the controller 41a outputs through the connector 73a video signals V1 output from the TV tuner.

• Navigation Unit

Figure 12:
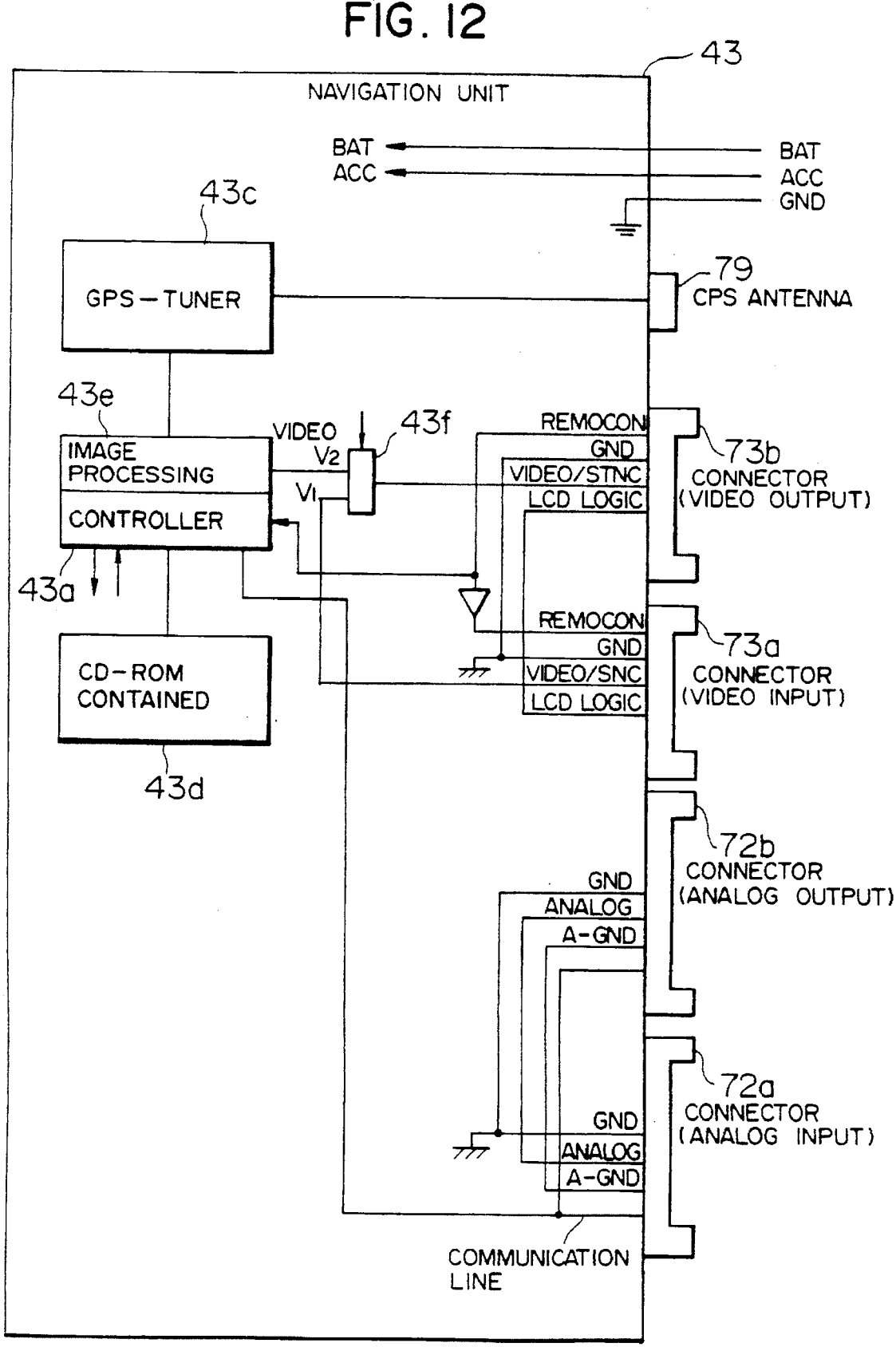
FIG. 12 is a simplified schematic showing the arrangement of a navigation unit.

FIG. 12 is a simplified schematic showing the arrangement of the navigation unit 43, wherein numeral 72a denotes an analog input side connector, numeral 72b denotes an analog output side connector, numerals 73a, 73b denote video signal I/O connectors, and numeral 79 denotes a GPS antenna terminal. In the navigation unit, numeral 43a denotes a controller includes a microprocessor, numeral 43c denotes a GPS tuner, numeral 43d denotes a CD-ROM for storing map data, 43e denotes a image processing unit for creating a map image based on the map data read from a CD-ROM, and numeral 43f denotes a selector.

Audio signals input from the connector 72a are output from the connector 72b passing directly through the navigation unit. On the other hand, video signals are selected by the selector 43f and output to the video device of the next stage from the connector 73b. That is, the controller 43a controls the selector 43f, selects either video signals V1 input from the video device of the previous unit (TV tuner) and video signals V2 created by the image processing unit 43e and outputs the selected images through connector 73b.

• Arrangement View of Video Monitor

Figure 13:
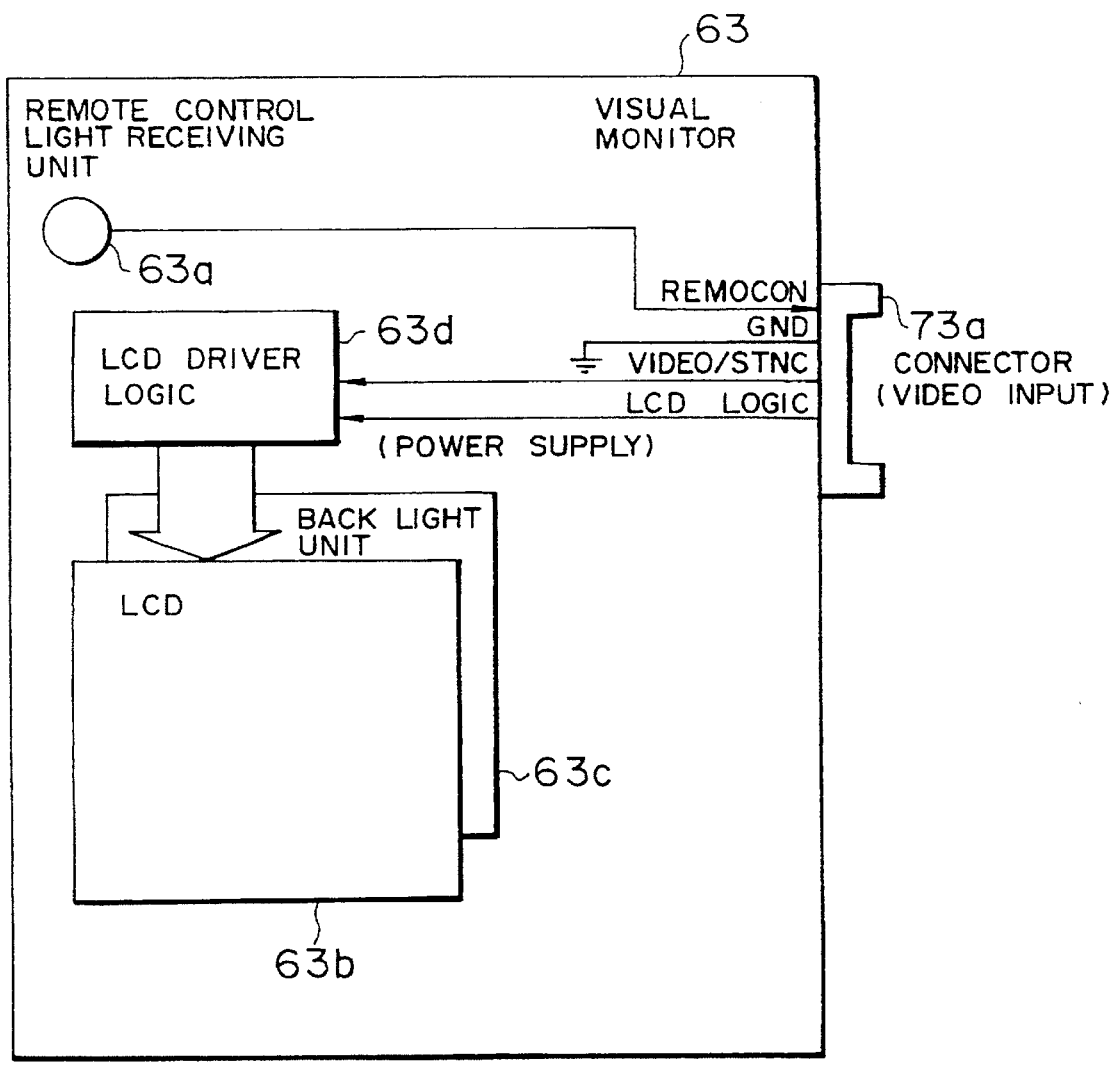
FIG. 13 is a simplified schematic showing the arrangement of a video monitor.

FIG. 13 is a simplified schematic showing the arrangement of the video monitor 63, wherein numeral 73a denotes a connector for inputting video signals and outputting a remote control signal (REMOCON). In the video monitor 63, numeral 63a denotes a remote control light receiving unit, numeral 63b denotes a liquid crystal panel, numeral 63c denotes a back light unit and numeral 63d denotes a liquid crystal drive logic unit.

The video monitor 63 transmits the remote control signal REMOCON received through the remote control light receiving unit 63a to other video devices through the connector 73a. In addition, the video monitor 63 displays an image on the liquid crystal panel 63b based on the video signals input from the connector 73a.

(d) Processing Affected by System Control Unit

Processing effected by the system control unit 21 will now be described.

(d-1) Switch of Audio Sources

Figure 14:
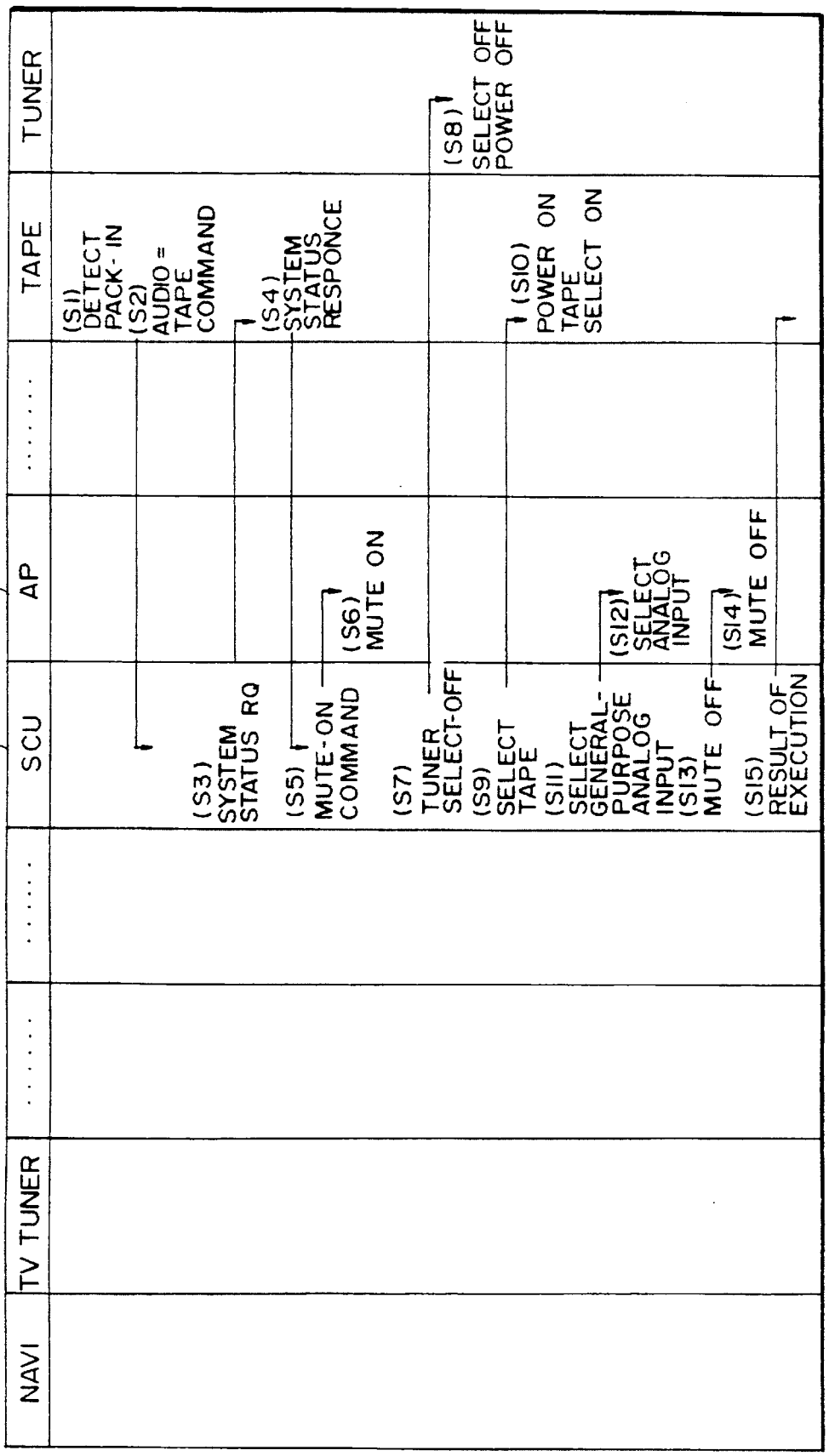
FIG. 14 is a diagram showing a processing sequence when a source is switched from a tuner to a tape.

FIG. 14 is a diagram explaining a processing sequence used when a signal source is switched from a tuner to a cassette tape player.

When a cassette tape is inserted in the tape player while the tuner is in operation (pack-in detection: S1), the tape player sends a request signal (AUDIO=TAPE: S2) to the SCU 21 for switching the audio source to the tape player.

The system control unit 21 then issues a system status request to the tape player in response to the request signal to confirm whether or not the tape player is connected to the bus (S3). When the tape player receives the system status request, it returns a system status response to confirm its presence (S4).

After the confirmation of the presence of the tape player, the system control unit 21 issues a mute-on command to the audio processor (AP) 37 (S5). On receiving the mute-on command, the audio processor turns on the mute (S6).

Thereafter, the system control unit 21 issues a tuner select-off command to the tuner (S7), and the tuner turns off its power in response to the command. Next, the system control unit 21 issues a tape select command to the tape player (S9). The tape player turns on its power in response to the command and starts to play (S10).

Thereafter, the system control unit 21 issues an analog input select command to the audio processor 37 (S11). The audio processor 37 selects signals input from the analog connector 72a in response to the select command (S12). Next, the system control unit 21 issues a mute-off command to the audio processor 37 (S13). On receiving the mute-off command, the audio processor 37 turns off the mute and inputs audio signals from the tape player to the amplifier to output sound to the speakers (S14). Thereafter, the system control unit 21 signals the tape player which transmitted the source switch request (S15) of the successful completion of the source switching process. When the source switching process fails for any reason, the system control unit 21 transmits a NG (not good) signal to the source switch requester, whereas when the switching of the source is successful, it transmits an OK signal.

Although the aforesaid describes a case in which the source switch request is issued from the audio source on the detection of the insertion of the tape cassette, it is of course possible for the commander to issue the source switch request. In this case, upon receiving the source switch request from the commander, the system control unit SCU switches the source according to the processing sequence shown in FIG. 14 and finally returns the result of execution to the commander.

(d-2) Switch of Video Sources

Figure 15:
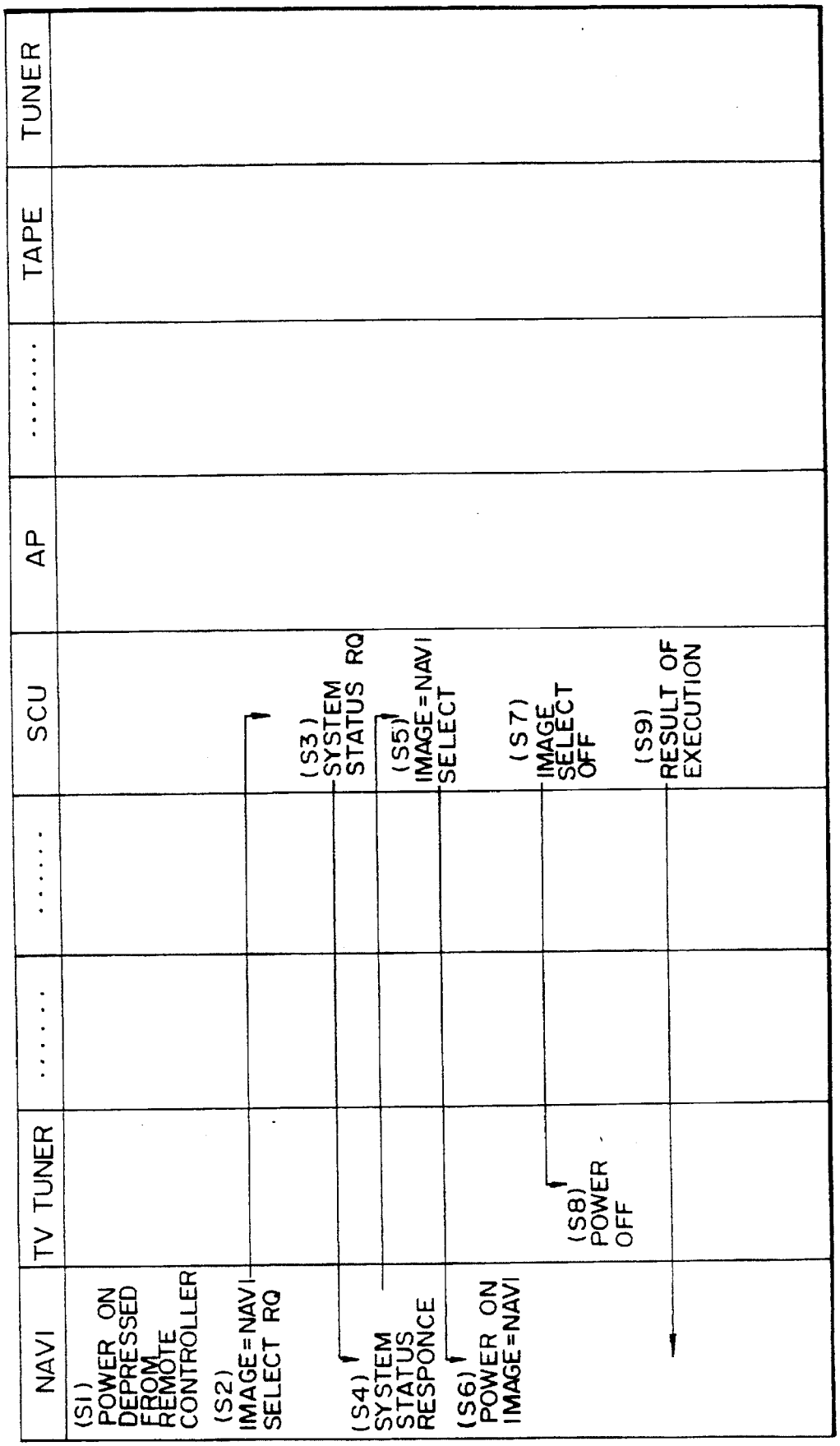
FIG. 15 is a diagram showing a processing sequence when a source is switched from a TV to a NAVI.

FIG. 15 is a diagram explaining a processing sequence when a video source is switched from the TV tuner to the navigation unit. When the "navigation power on" key of the remote controller 64 is pressed while an image from the TV tuner is displayed on the monitor (S1), the navigation unit 43 detects the key depression through a remote control signal and sends a request command (NAVI select command: 52) to the SCU 21 for switching the video source to the navigation unit.

On receiving the above-mentioned request command, the system control unit 21 issues a system status request to the navigation unit 43 to confirm whether the navigation unit actually is present or not (S3). On receiving the system status request, the navigation unit 43 returns a system status response to confirm its presence (S4).

When the system control unit 21 confirms the presence of the navigation unit, it issues an image=NAVI select command to the navigation unit (S5). The navigation unit 43 turns on its power in response to the command (S6). Thereafter, the system control unit 21 issues a video select-off command to the TV tuner (S7) and the TV tuner turns off its power in response to the command (S8). Next, the system control unit 21 signals the navigation unit which transmitted the source switch request (S9) of the successful completion of the source switching process.

(d-3) ACC Power Supply ON Control

Figure 16:
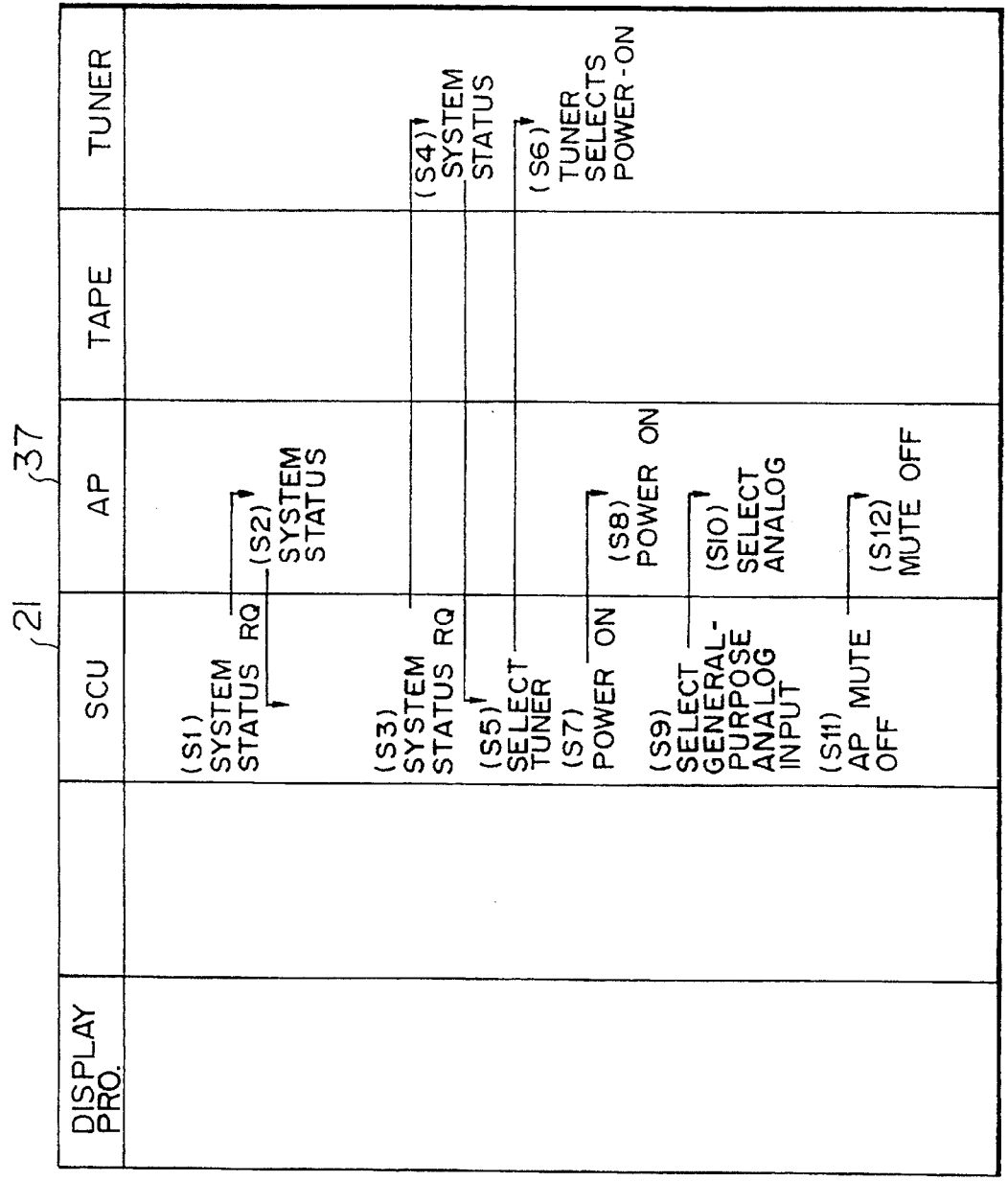

FIG. 16 is a diagram showing a processing sequence for restoring operation of a unit which was in operation when an ACC power supply was turned off, and for activating the unit by turning on its power when the ACC power source is re-energized.

When the system control unit 21 detects an ACC signal (=14 V), it issues a system status request to the audio processor (AP) and confirms the presence of the audio processor (S1). When the audio processor 37 returns a status response to the above-mentioned request (S2), the system control unit 21 identifies a unit (such as the tuner), which was in operation when the power supply was turned off, from the information stored in its memory and confirms the presence of the tuner by issuing a system status request to the tuner (S3). When the tuner returns a status response to the above-mentioned request (S4), the system control unit 21 issues a tuner select command to the tuner (S5). The tuner turns on its power in response to the command (S6).

Next, the system control unit 21 issues a power-on command to the audio processor 37 (S7). The audio processor 37 turns on its power in response to the above-mentioned command (S8). Thereafter, the system control unit 21 issues an analog input select command to the audio processor 37 (S9). The audio processor 37 selects audio signals input from the analog connector 72a in response to the command (S10).

Thereafter, the system control unit 21 issues a mute-off command to the audio processor 37 (S11). On receiving the mute-off command, the audio processor turns off the mute, inputs audio signals from the tuner and outputs sound from the speakers (S12).

(d-4) Control to be Executed when Power Supply is Restored

Figure 17:
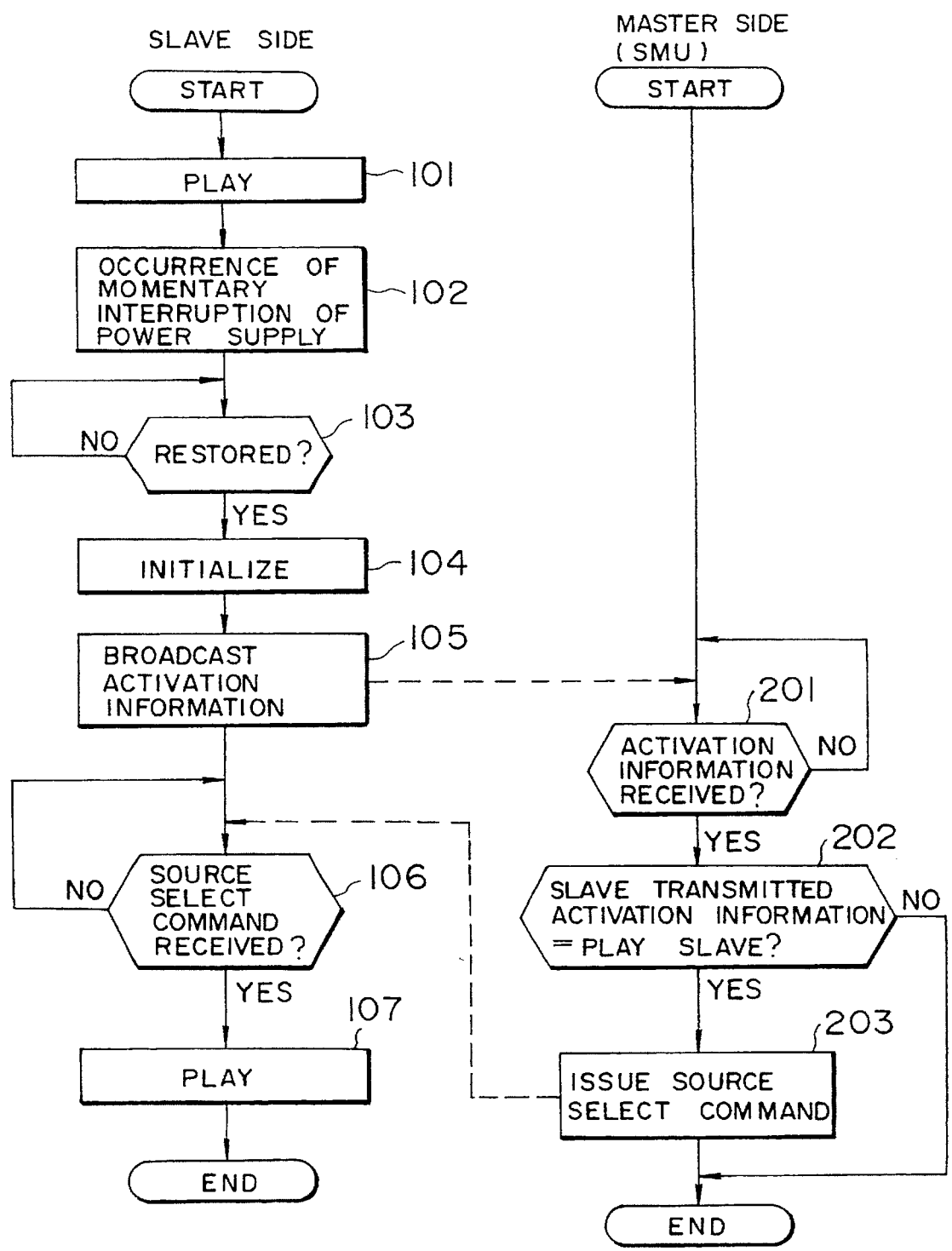
FIG. 17 is a flowchart showing when the power supply to a slave (source) is momentarily interrupted and then restored.

- Control to be Executed when Power Supply to Slave is Momentarily Interrupted and then Restored FIG. 17 is a flowchart showing a procedure executed when the power supply to a slave (source) is momentarily interrupted and then restored.

When the power supply to a predetermined slave, e.g., the cassette player 32 is momentarily interrupted while it is in operation and then restored and stabilized, (steps 101–103), the controller of the cassette player 32 initializes memories and registers (step 104) and then broadcasts activation information to all of the units (step 105). Thereafter, the cassette player 32 waits until it receives a source select command from the system control unit 21, which shows as a master (step 106).

When the system control unit 21 receives the activation information (step 201), it checks whether the cassette player which issued the activation information (activation information transmission source) is the same as the source identified in its memory as being played (step 202). When the former source is not the same as the latter source, the system control unit 21 takes no action, whereas when the former source is the same as the later source, the system control unit 21 issues a source select command to the former source (cassette player), thereby causing the source to play (step 107).

On receiving the source select command, the cassette player 32 enters the play state and outputs sound (step 107).

As described above, when the power supply to a predetermined source is momentarily interrupted and then restored, activation information is transmitted from the source to the system control unit 21, the system control unit determines whether the source from which the activation information was transmitted is a source being played or not. When it is the source being played, the system control unit causes the source to play. With this operation, when the power supply to a source being played is momentarily interrupted and then restored, the source can be automatically made to play, and thus to return to the same state as before the occurrence of the interruption of the power supply.

Figure 18:
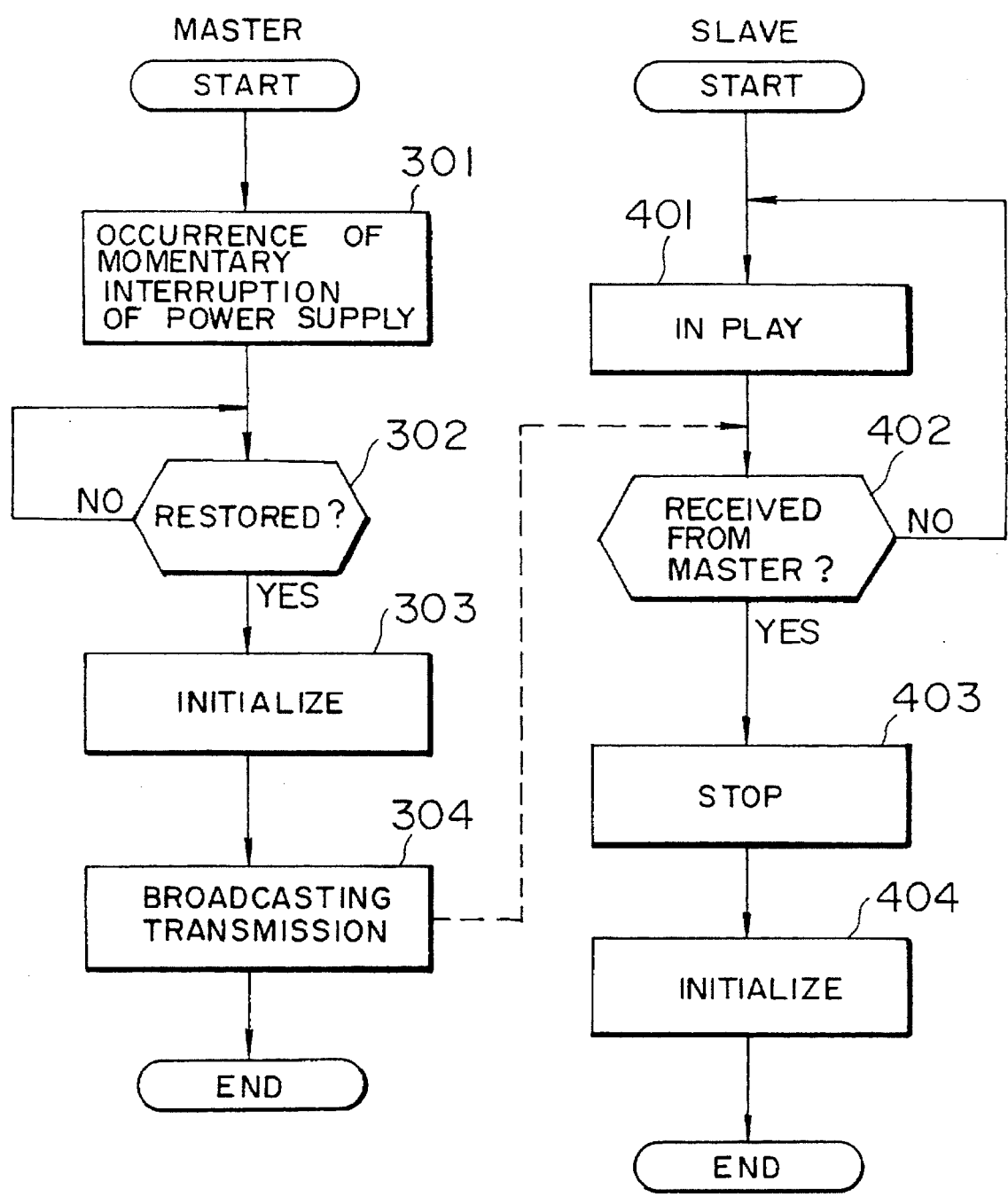
FIG. 18 is a flowchart showing when the power supply to a master (control unit) is momentarily interrupted and then restored.

- Control to be Executed when Power Supply to Master is Momentarily Interrupted and then Restored FIG. 18 is a flowchart showing a procedure executed when the power supply to a master (system control unit) is momentarily interrupted and then restored.

When the power supply to the system control unit 21 is momentarily interrupted and then restored and stabilized (steps 301–302), the system control unit 21 initializes the internal state thereof (step 303) and broadcasts activation information to all of the units (step 304).

A unit being played which received the activation signal issued from the system control unit 21 stops (steps 401–403) and initializes the internal state thereof (step 404). The sources not being played also initialize their internal state. With the above-mentioned operation, when the power supply to the system control unit 21 is momentarily interrupted and then restored, the source being played is automatically stopped. This allows the content held by the system control unit to coincide with the content of the system, and prevents multiple audio sources from playing simultaneously.

(e) Command to Unit in Operation

A command to a unit in operation is directly applied to the unit by the commander or the remote controller. For example, when the FM/AM tuner is in operation, a preset channel is selected, seek operation is effected or a band is switched using the keys or the remote controller. A command for these operations is directly transferred from the commander to the tuner through the communication lines to control the operation of the tuner. This is also applicable to the other audio sources and video sources in the same way. Note, this embodiment is arranged such that an operation command is issued to the video sources from the remote controller so that a remote control signal is sent to each video source through the remote control line.

(f) Another Arrangement of Audio/Video System

Figure 19:
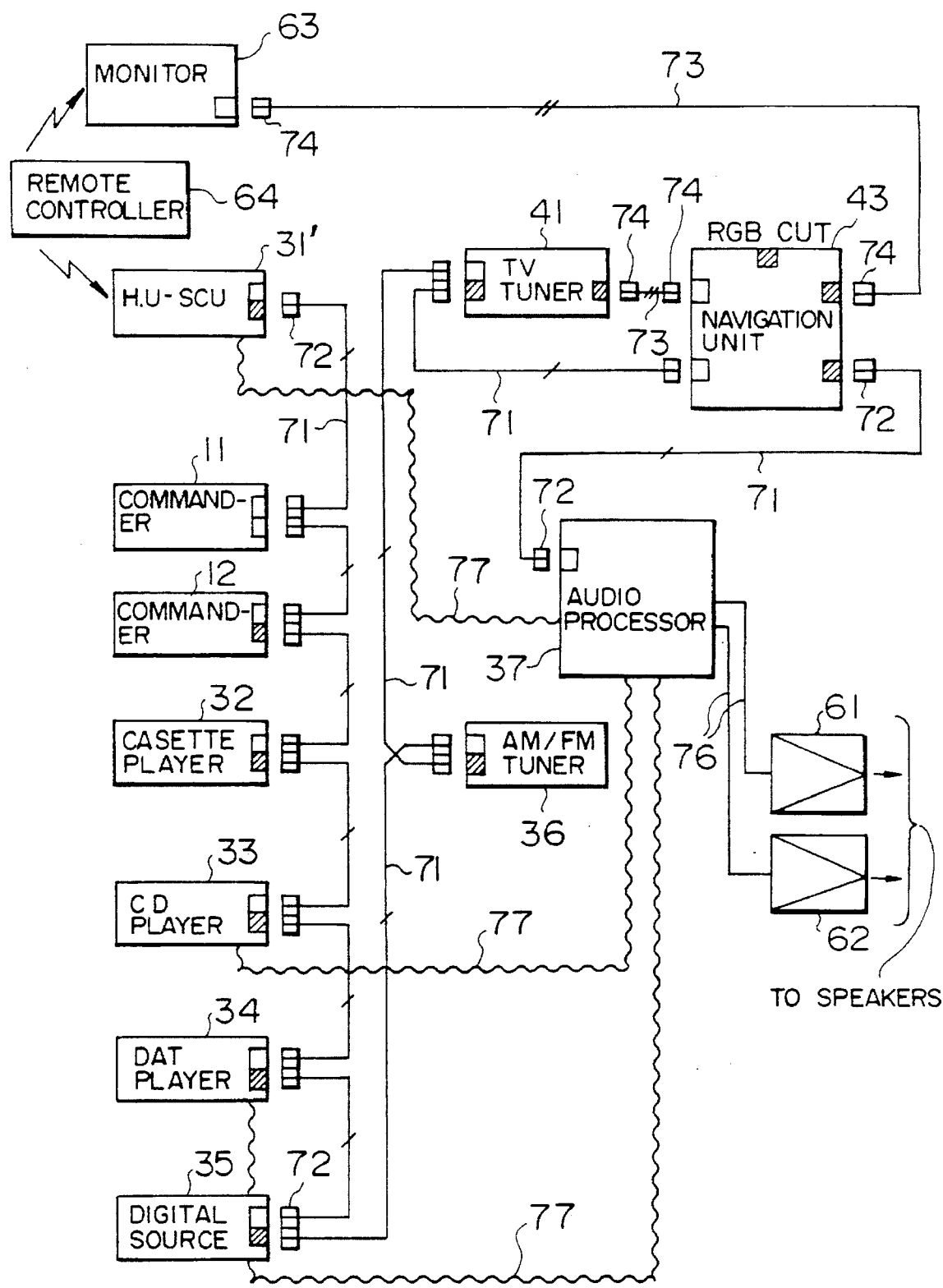
FIG. 19 is a block diagram showing the overall arrangement of a second audio/video system in accordance with the present system.
Figure 20:
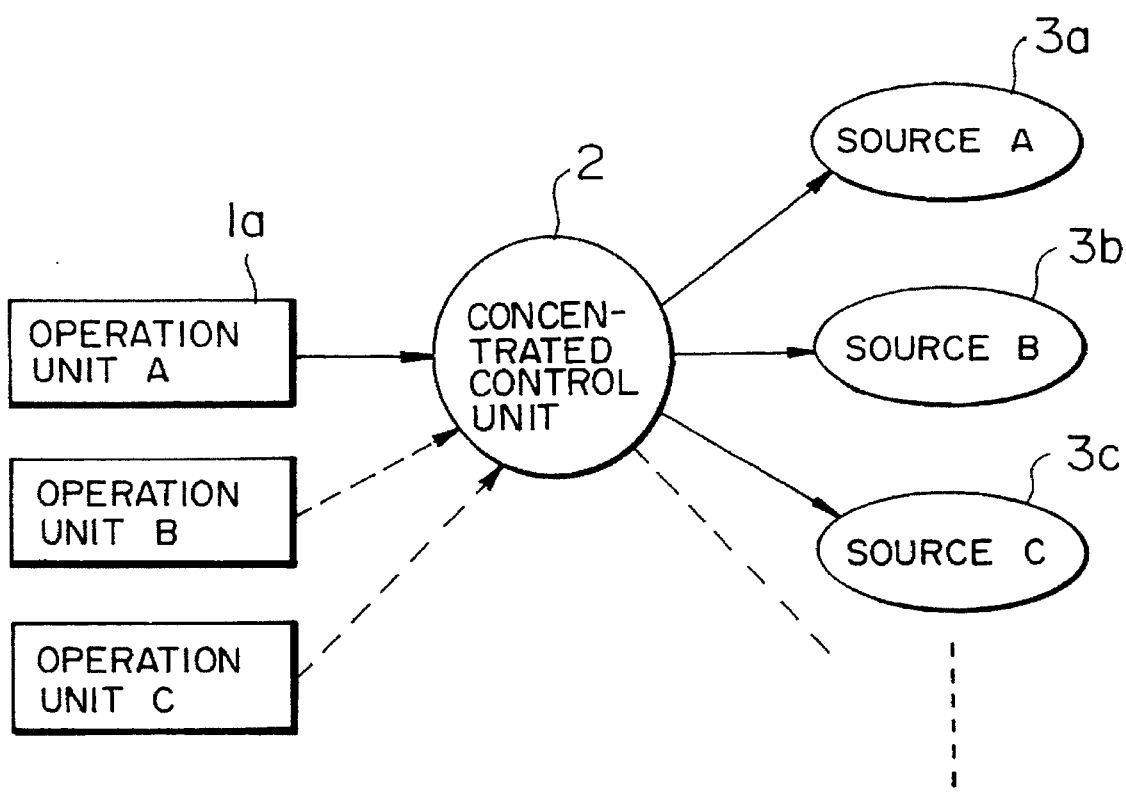
FIG. 20 is a diagram showing operation of a prior art system.

The audio/video system of FIG. 2 has the system control unit 21 which is provided as a separate unit. The circuitry of the system control unit 21 is partially the same as that of the commander 11 and the head unit 31. Thus, it is possible to integrate the function of the system control unit 21 with the controllers 11a, 31a of the commander 11 and the head unit 31. FIG. 19 shows such an audio/video system in which the function of the system control unit is integrated with the head unit 31 (or the commander 11). The same numerals as used in FIG. 2 are used to denote the same elements in FIG. 19. Numeral 31' denotes a head unit also serving as a system control unit (HU.SCU). Note, the commander can be also contained in the head unit.

Although the present invention is described with reference to certain embodiments, it is not limited thereto. That is, although FIG. 2 and FIG. 19 show embodiments in which the system includes a considerable number of units, other embodiments need not include all of these units. Further, other units not shown in the disclosed embodiments may be included. Various other modifications can be made which fall within the scope of the present invention.

We claim:

1. A communication system for activating a selected one of a plurality of audio/video devices in response to an activation request signal transmitted on a first bus line, the selected audio/video device transmitting signals to an audio/video output device on a second bus line, wherein the signals transmitted by the selected audio/video device are adjustable in response to adjustment command signals transmitted on the first bus line from a command unit, the communication system comprising:

a bus, including the first and second bus lines, connectable to the plurality of audio/video devices, the command unit and the output device; and a system control unit, connected to the first bus line, for generating an activation command signal on the first bus line in response to the activation request signal transmitted from the command unit;

wherein the selected audio/video device transmits signals to the output device on the second bus line in response to the activation command signal; and wherein the adjustment command signals are transmitted unchanged on the first bus line from the command unit to the selected audio/video device.

2. A communication system according to claim 1, wherein the system control unit comprises:

means for receiving activation request signals corresponding to activating the selected audio/video device;

means for transmitting a status request signal to the selected audio/video device; and means for receiving a status response signal transmitted by the selected audio/video device to confirm that the selected audio/video device is connected to the bus.

3. A communication system according to claim 1, wherein the activation command signal is in the form of a signal frame including a destination address, a transmission source address, transmission data, and an error detection code.

4. A method for controlling from a command unit one of a plurality of audio/video devices connected to a bus, each audio/video device transmitting audio/video signals to an audio/video output device connected to the bus, comprising the steps of:

transmitting an activation request signal on the bus from the command unit, the activation request signal being addressed to a selected one of the audio/video devices;

detecting, using a system control unit, the activation request signal on the bus;

transmitting an activation command signal from the system control unit on the bus, the command signal being addressed to the selected audio-video device;

in response to the activation command signal, transmitting from the selected audio/video device signals to the output device on the bus; and transmitting, directly and unchanged, adjustment command signals from the command unit to the selected audio/video device on the bus, the adjustment command signals including data for adjusting a function characteristic of the audio/video signal.

5. A method according to claim 4, further comprising:

storing an address associated with the selected audio/video device;

causing each of the plurality of audio/video devices to transmit a device activation signal when power is initially supplied, each device activation signal including a transmission source address corresponding to an associated transmitting audio/video device;

detecting device activation signals transmitted on the first bus line from the plurality of audio/video devices;

comparing the transmission source address of a detected device activation signal with the address stored in memory; and transmitting the activation command signal to the transmitting source device when the transmission source address of the activation command signal is the same as the address stored in memory.

6. A method according to claim 4, further comprising:

initializing an operating state of the system control unit upon power up; and transmitting reset command signals to each of the plurality of audio/video devices connected to the bus upon initialization of the operating state such that the selected audio/video device stops transmission of signals to the output device on the second bus line.

* * * * *